April 28, 1936.  E. M. DE SHERBININ  2,038,547
NUT THREADING MACHINE
Filed Aug. 22, 1933  11 Sheets-Sheet 1

Inventor
Eric M. de Sherbinin
By Popp & Powers
Attorneys

April 28, 1936.  E. M. DE SHERBININ  2,038,547

NUT THREADING MACHINE

Filed Aug. 22, 1933   11 Sheets-Sheet 3

Inventor
Eric M. de Sherbinin
By Robert Powers
Attorneys

April 28, 1936.  E. M. DE SHERBININ  2,038,547
NUT THREADING MACHINE
Filed Aug. 22, 1933  11 Sheets-Sheet 4
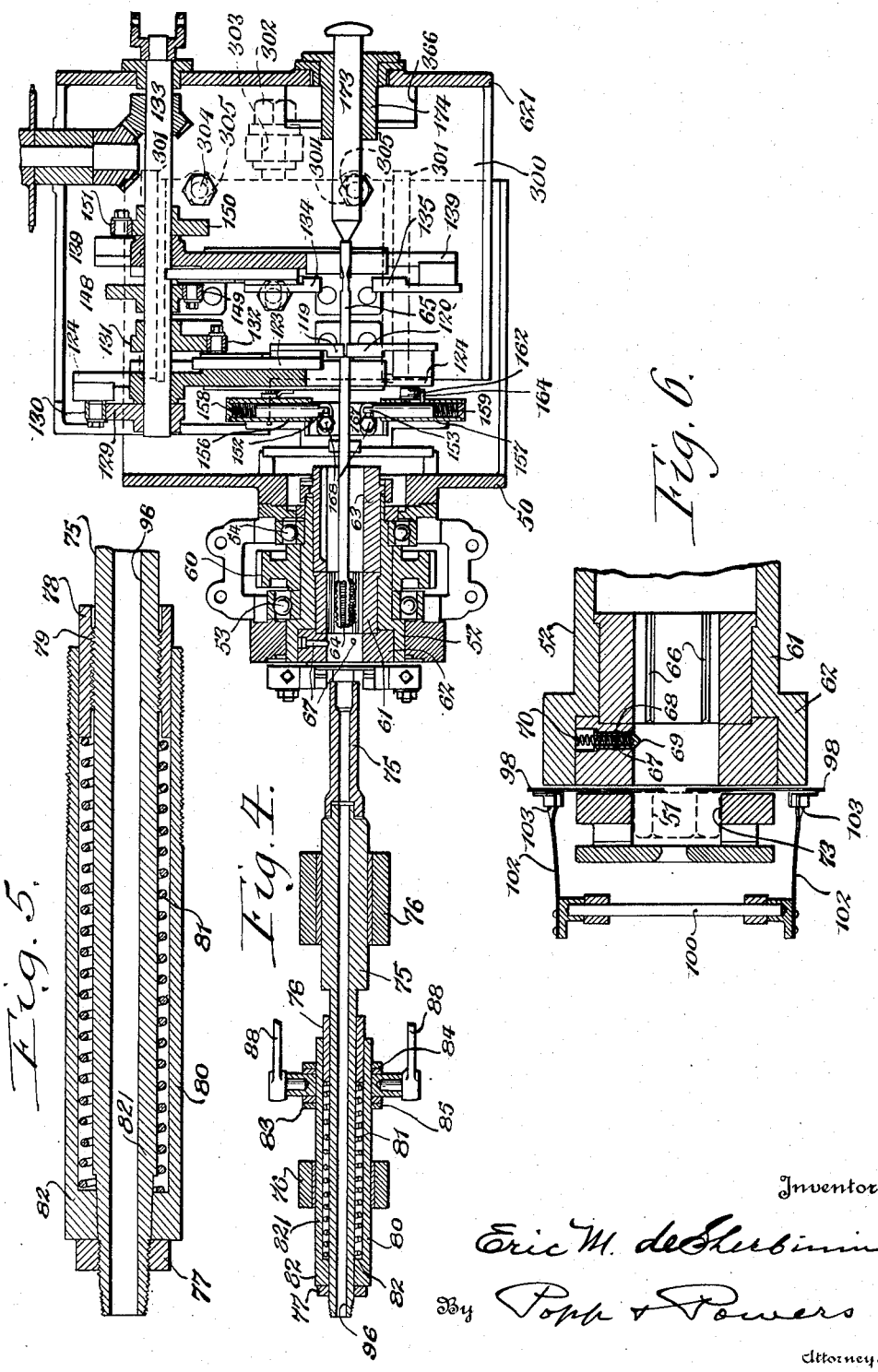

April 28, 1936.  E. M. DE SHERBININ  2,038,547
NUT THREADING MACHINE
Filed Aug. 22, 1933   11 Sheets-Sheet 5
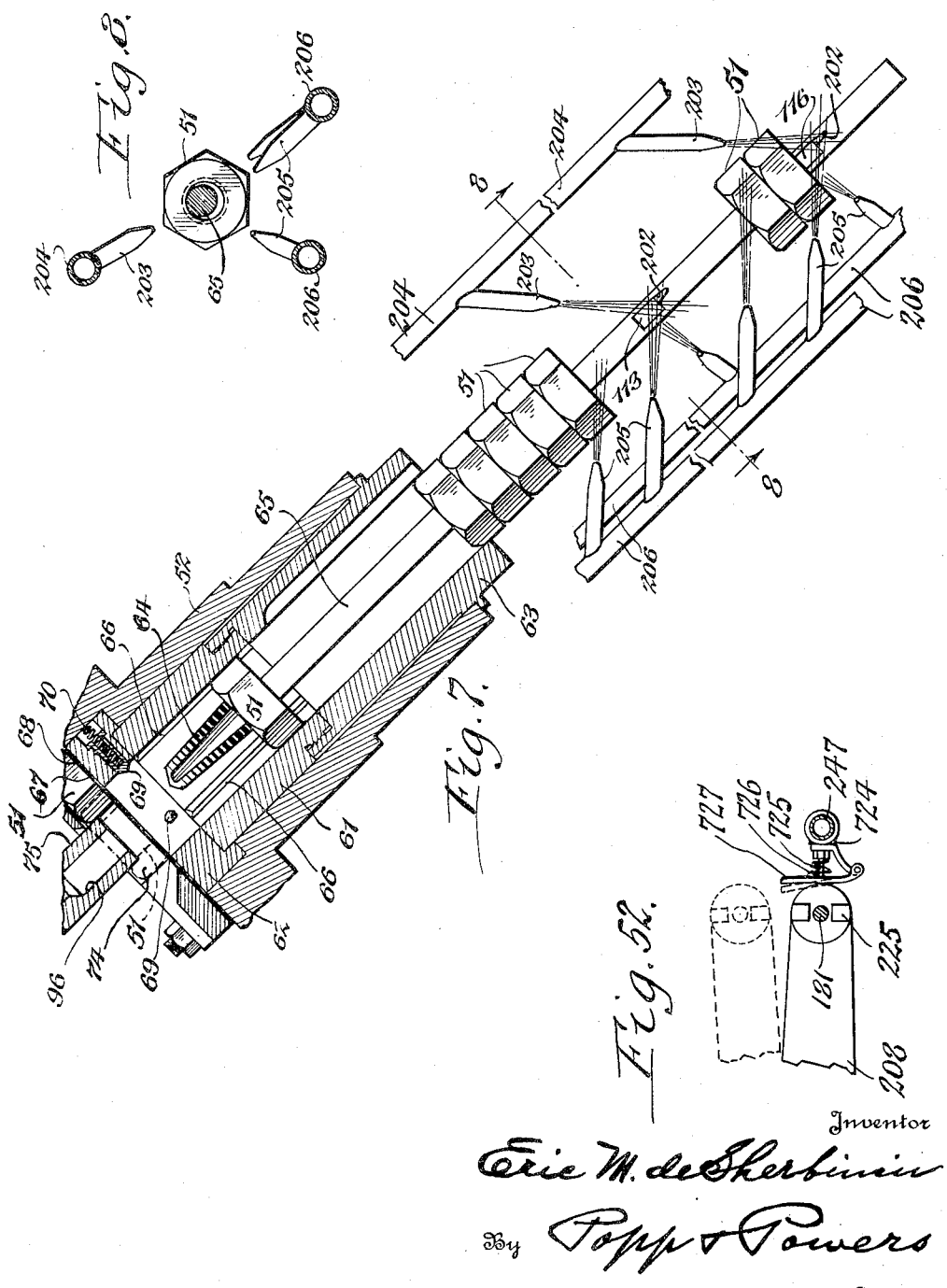

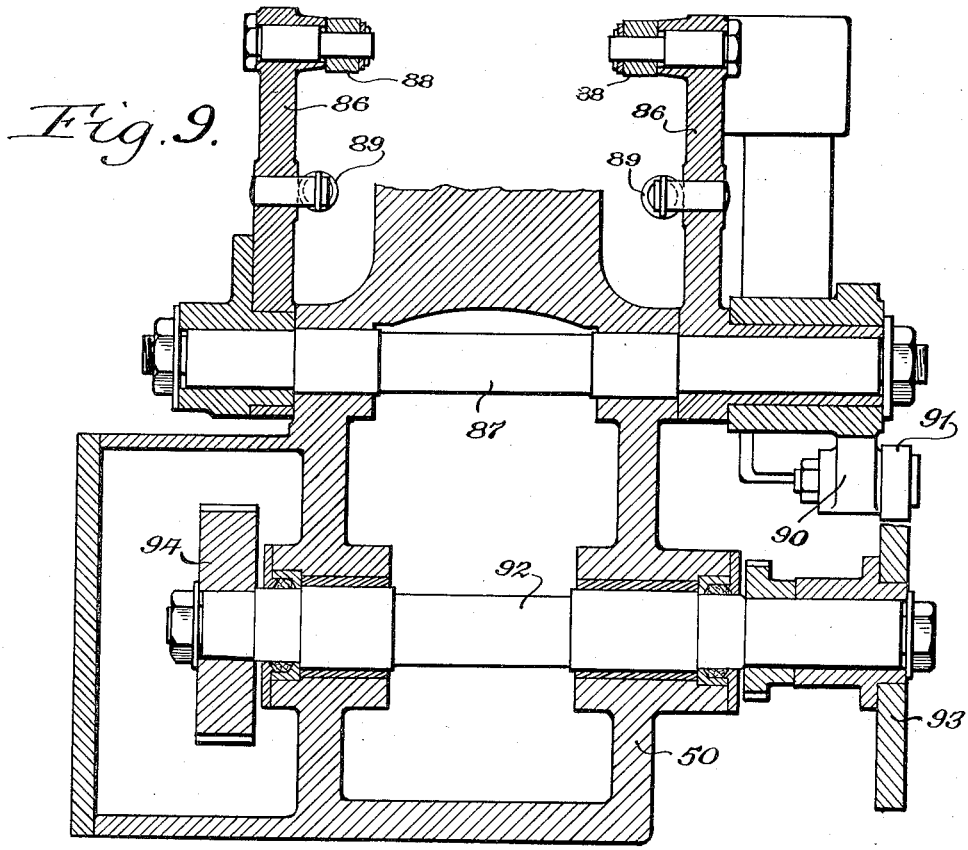

April 28, 1936. E. M. DE SHERBININ 2,038,547
NUT THREADING MACHINE
Filed Aug. 22, 1933 11 Sheets-Sheet 7
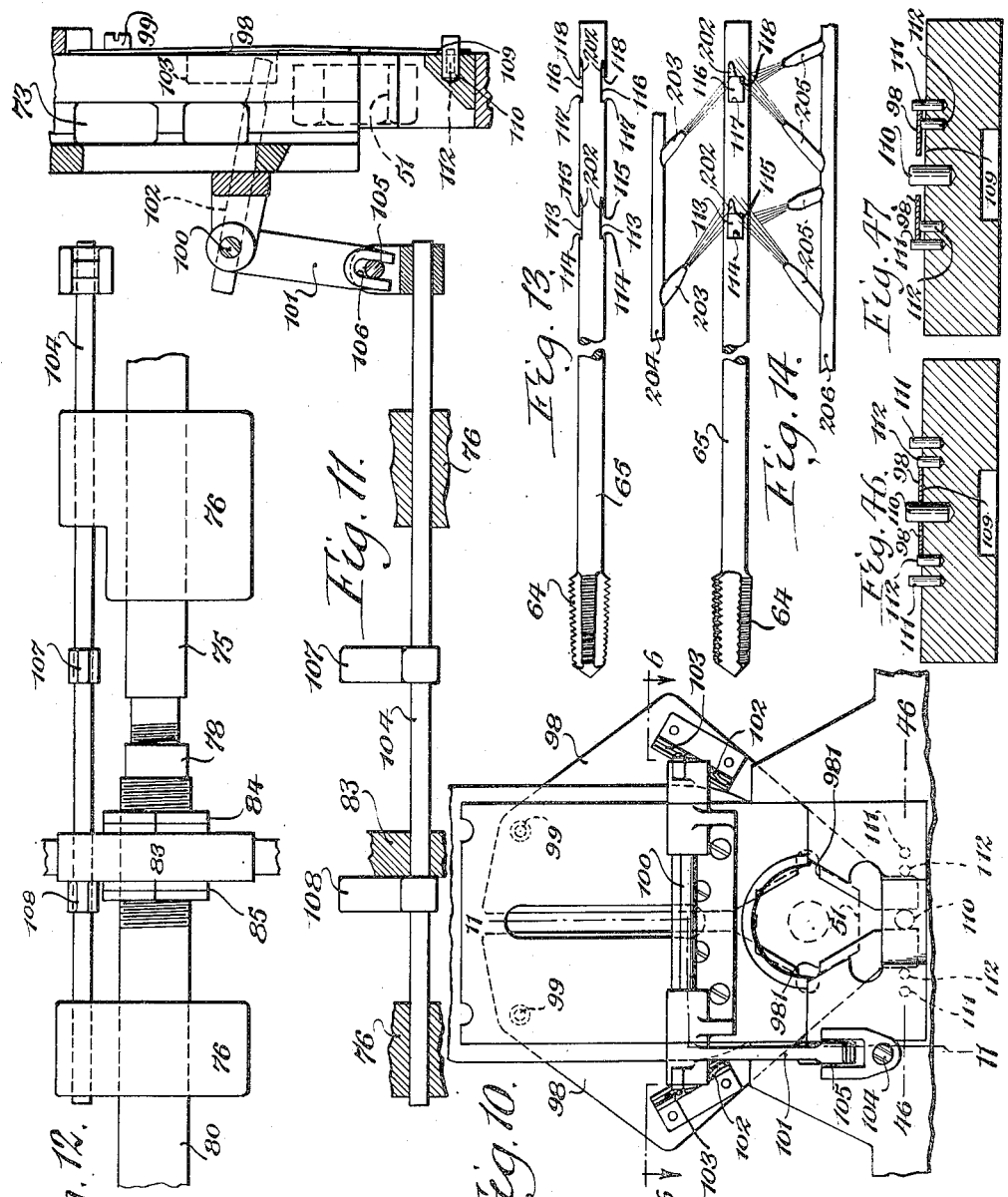
Inventor
Eric M. deSherbinin
By Popp & Powers
Attorneys

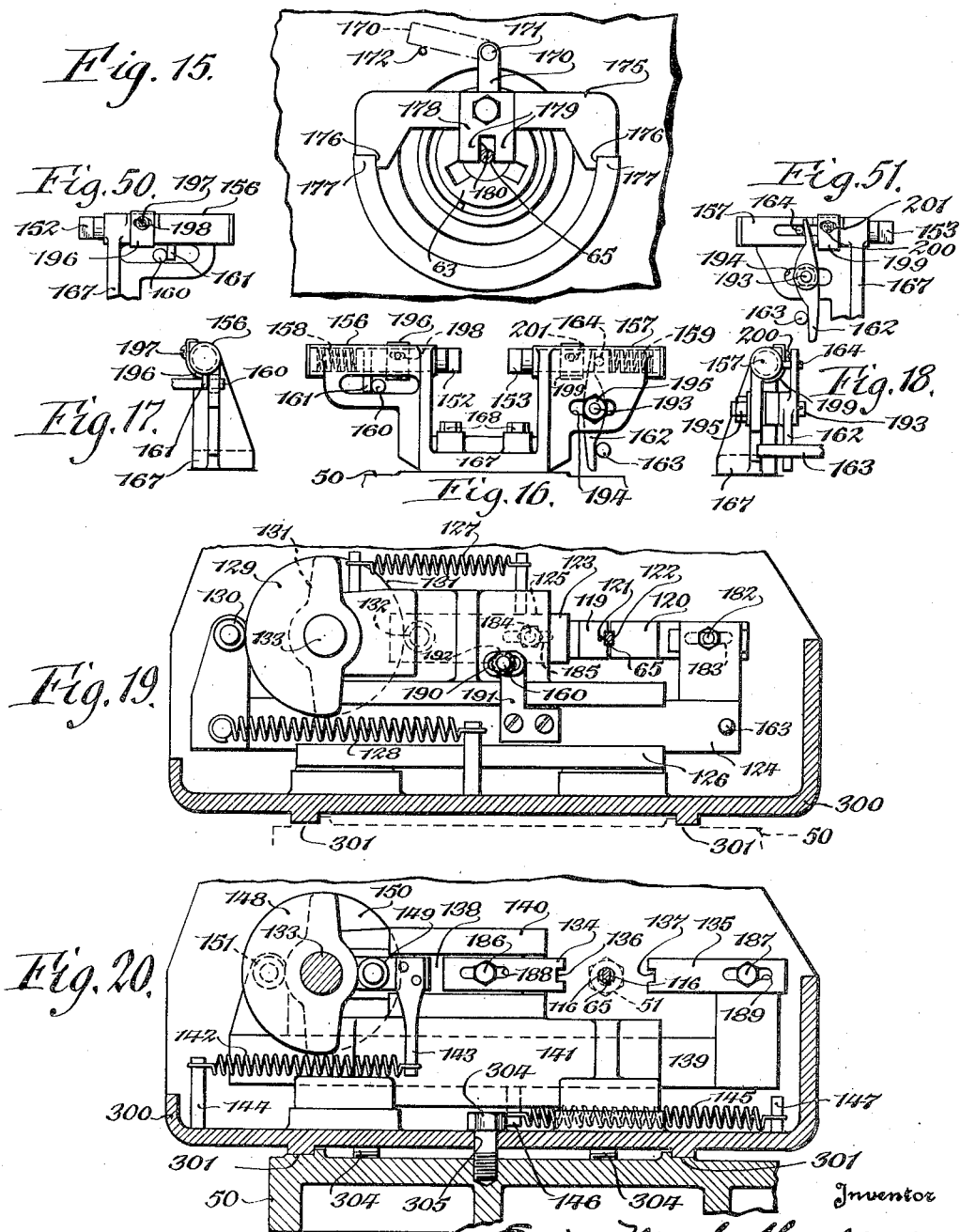

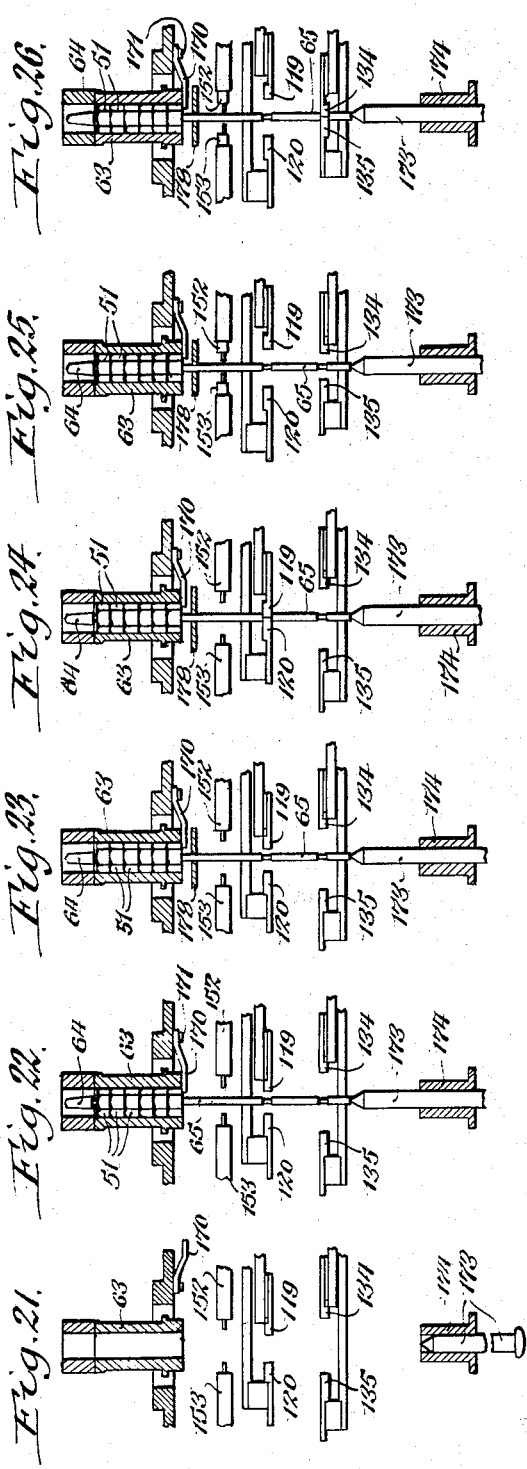
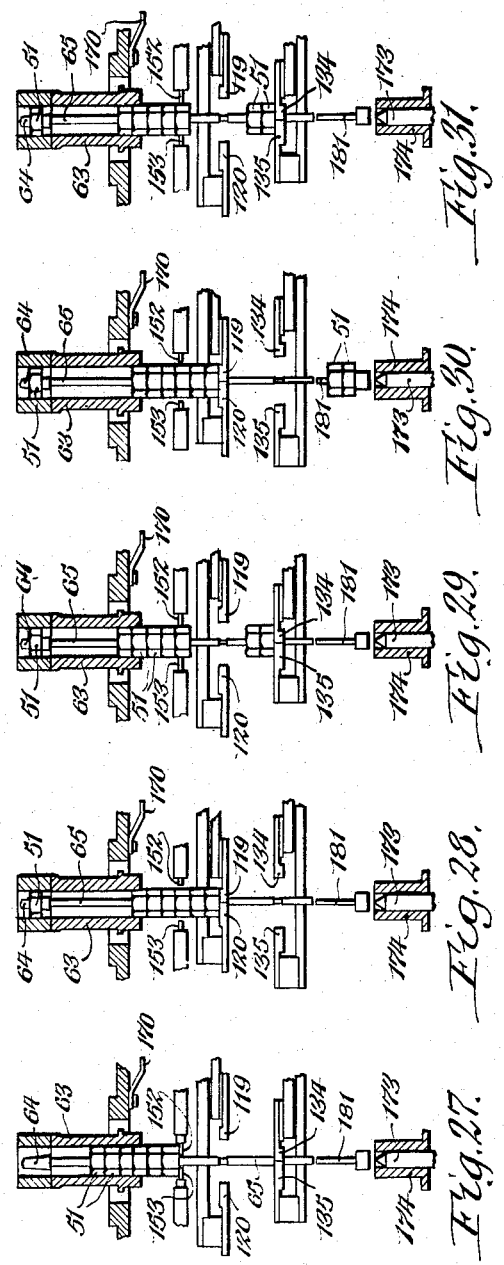

April 28, 1936. E. M. DE SHERBININ 2,038,547
NUT THREADING MACHINE
Filed Aug. 22, 1933 11 Sheets-Sheet 10
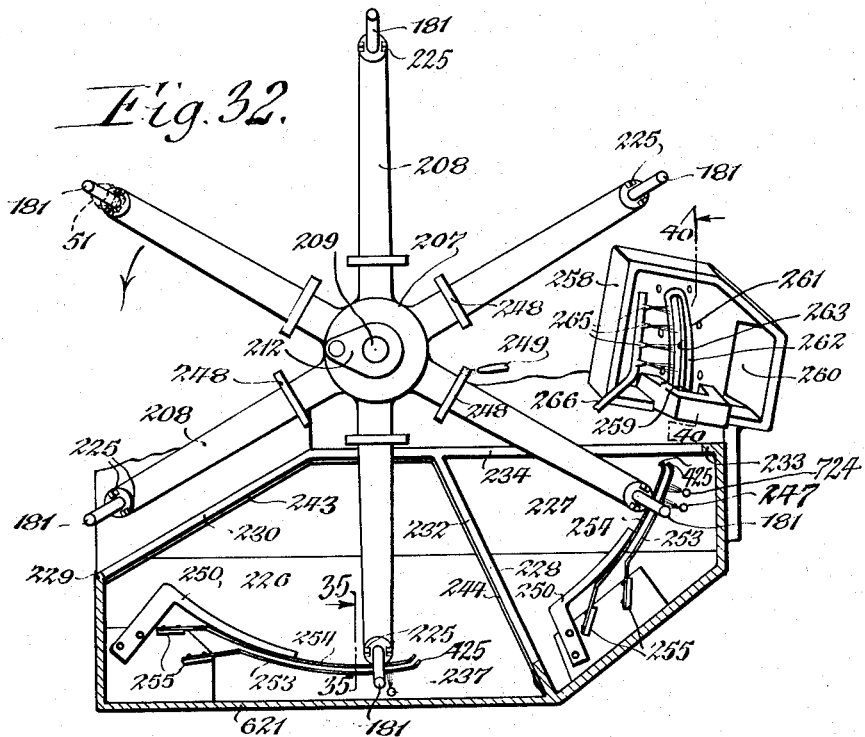
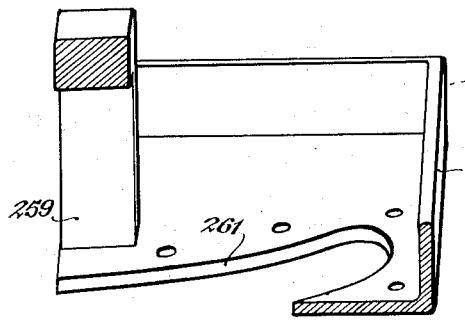
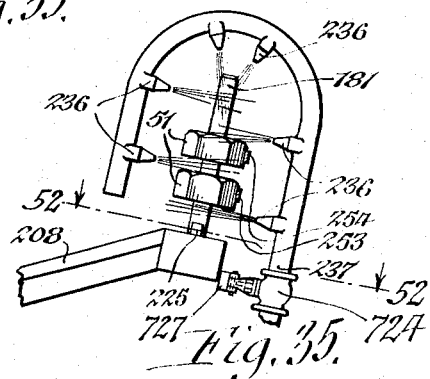
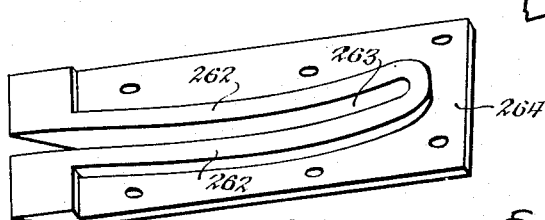
Inventor
Eric M. deSherbinin
By Popp & Towers
Attorneys April 28, 1936.  E. M. DE SHERBININ  2,038,547
NUT THREADING MACHINE
Filed Aug. 22, 1933  11 Sheets-Sheet 11
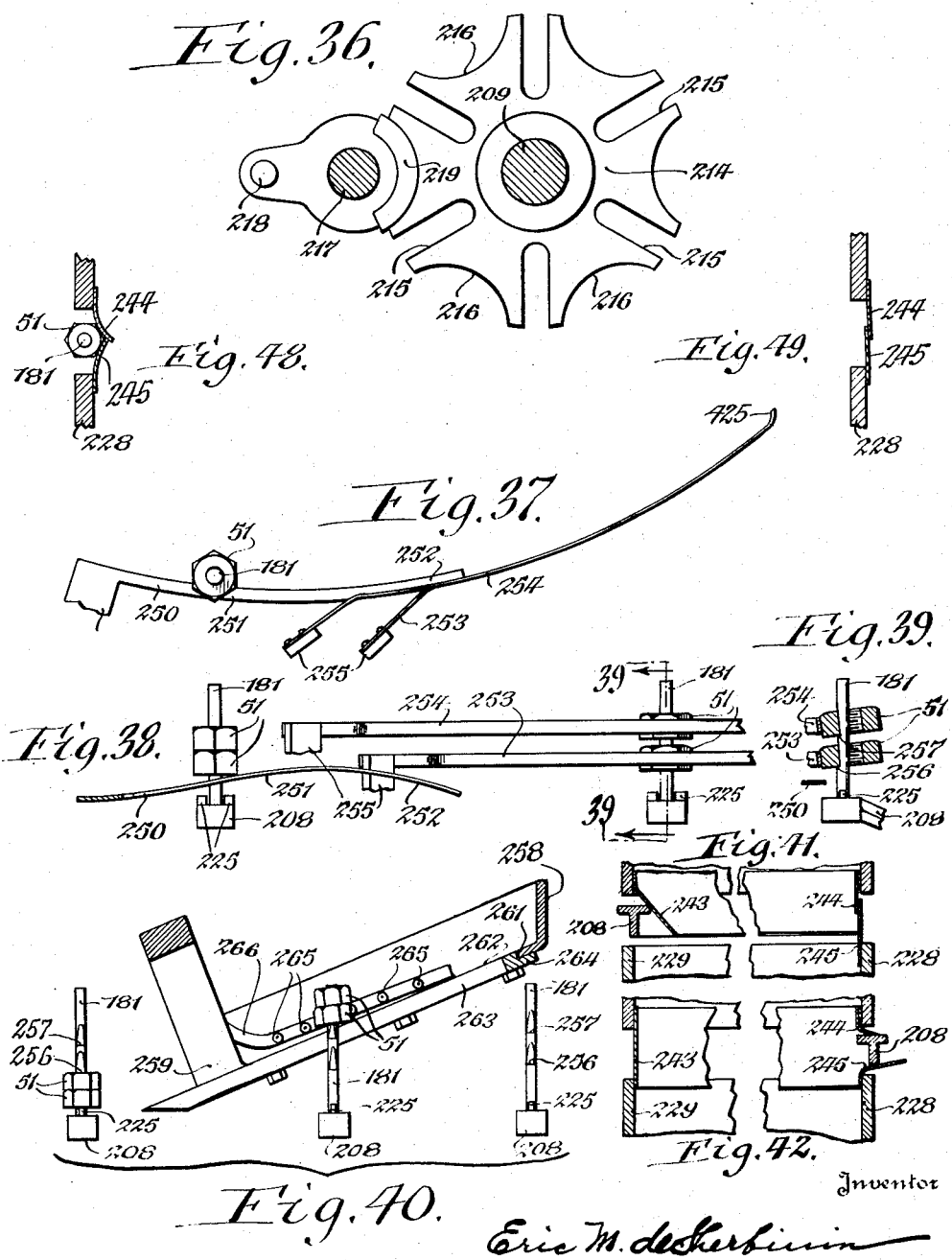

Patented Apr. 28, 1936

2,038,547

UNITED STATES PATENT OFFICE 2,038,547

NUT THREADING MACHINE

Eric M. de Sherbinin, Toronto, Ontario, Canada, assignor of twenty one-hundredths to Harold Brock Walker, Toronto, Ontario, Canada, twenty one-hundredths to George Kroupsky, Buffalo, N. Y., and sixty one-hundredths to said de Sherbinin Application August 22, 1933, Serial No. 686,208

10 Claims. (Cl. 10—139)

This invention relates to a machine for producing screw threads in the bore of blank screw nuts.

One of the objects of this invention is to incline the tapping mechanism with reference to the horizontal plane so that the nuts upon being fed to the tapping mechanism are not liable to become displaced but will tend constantly to assume a position in which they are axially in line with the threading tap and associated parts so that they can be moved lengthwise thereof for accurately and uniformly cutting the threads without causing any interference with the free movement of the nut.

Another object is to leave a space between a nut being tapped and the others that already have been tapped so that the nut leaving the tap does not have to push a train of nuts and thereby cause resistance.

Another object of this invention is to provide means for supporting the nuts in a properly aligned position with reference to the nut driving and tapping mechanism preparatory to being moved toward the latter and thereby avoiding tipping of the nut, inaccurate threading of the same, or clogging of the machine.

Another object of the invention is to provide improved means for moving the blank nut from the feed chute to the tapping mechanism so that jamming of the machine is prevented, and also to so organize this feed mechanism that the same can be readily adjusted to suit different sizes of screw nuts.

A further object of this invention is to provide means for permitting a straight shank tap to be employed and so organizing the means which hold this shank that the nuts are moved over the same by gravity and thereby avoid the necessity of using any special means for carrying the nuts lengthwise over the tap and its shank.

Another object is to clean the nuts while they pass down a shank of the tap.

A still further object of this invention is to provide means for cleaning the finished screw nuts preparatory to storing, packing, or using the same.

Another object is to stop and prevent shaving of the screw threads on the pitch diameter and keep within the closest tolerance possible.

Additional objects of this invention are to improve the machine in its various details of construction as will be more fully described later on.

In the accompanying drawings:

Figure 4 is a horizontal longitudinal section, on an enlarged scale, taken substantially on line 4—4 Fig. 3.

Figure 5 is a fragmentary longitudinal section, on a still larger scale, of the rear part of the plunger and associated parts, whereby blank nuts are fed from the supply chute to the threading mechanism.

Figure 6 is a fragmentary horizontal section, on an enlarged scale, taken on line 6—6 Fig. 3.

Figure 7 is a fragmentary vertical longitudinal section, on an enlarged scale, similar to Fig. 3, showing more particularly the nut driving and guiding bushing, the threading tap and shank, the means for propelling and aiding gravity to move the nuts, and cleaning the nuts while on the tap shank, and adjacent parts.

Figure 8 is a vertical transverse section, taken on line 8—8 Fig. 7.

Figure 9 is a fragmentary vertical section, on an enlarged scale, taken on line 9—9 Fig. 1, and showing part of the mechanism for producing longitudinal reciprocation of the nut feeding plunger.

Figure 10 is a fragmentary vertical transverse section, taken on line 10—10 Fig. 3, and showing more particularly the shutter mechanism whereby the blank nuts are supported preparatory to being pushed by the plunger to the threading mechanism.

Figure 11 is a fragmentary vertical longitudinal section taken on line 11—11 Fig. 10.

Figure 12 is a top plan view of some of the parts shown in Fig. 11 in connection with the main frame of the machine and the nut feeding plunger.

Figure 13 is a plan view of the nut tap and its shank.

Figure 14 is a side elevation of the same in connection with the means whereby jets of washing fluid are delivered against the shank of the tap and holding surfaces for cleaning the same of chips, oil and the like therefrom and also assisting in propelling the nuts along the shank from the front end toward the rear end of the same.

Figure 15 is a fragmentary vertical transverse section, on an enlarged scale, taken on line 15—15 Fig. 3, showing means for temporarily arresting the forward movement of a row of nuts on the tap shank and also locating the tap and its shank in their central normal position.

Figure 16 is a fragmentary vertical transverse section, on an enlarged scale, taken on line 16—16 Fig. 3, and showing the means whereby the forward movement of a row of nuts on the tap shank is temporarily arrested at predetermined times.

Figures 17 and 18 are end views of the nut detent mechanism shown in Fig. 16 and viewed from opposite ends thereof.

Figures 19 and 20 are vertical transverse sections, on an enlarged scale, taken on the correspondingly numbered lines in Fig. 3, and showing more particularly the tap shank holding mechanism.

Figures 21-31 are diagrammatic views showing the parts which cooperate with the nuts and tap shank while setting up the machine ready for use, and also while the machine is in normal operation.

Figure 32 is a fragmentary top plan view of the mechanism whereby the nuts are taken off from the shank and then washed or cleaned by a liquid solution and air blast after being threaded and then discharged from the mechanism.

Figure 33 is a vertical longitudinal section of the chamber in which the nuts are discharged from the machine after the same have been threaded, washed, cleaned and dried.

Figure 34 is a perspective view of the nut removing cam or wedge which is arranged in the bottom of the delivery box or chamber whereby the nuts are elevated and removed from the rotatable carrier or reel of the cleaning and drying mechanism.

Figure 35 is a fragmentary vertical section, on an enlarged scale, taken on line 35—35 Fig. 32.

Figure 36 is a fragmentary horizontal section, on an enlarged scale, taken on line 36—36 Fig. 3 and showing means for imparting an intermittent rotary motion to the nut supporting reel, sweep or carrier of the nut cleaning mechanism.

Figure 37 is a fragmentary top plan view showing the means for separating two superimposed nuts on a carrying pin of the rotary reel for the purpose of exposing different parts of the nuts to the action of the jets of cleaning fluid.

Figure 38 is a side elevation of the same.

Figure 39 is a vertical transverse section taken on line 39—39 Fig. 38.

Figure 40 is a fragmentary vertical section taken on line 40—40 Fig. 32, and showing the means for removing the nuts from the carrying pins of the rotary reel and discharging the nuts from the machine by jets of air.

Figure 41 is a fragmentary vertical section of the nut cleaning chamber, taken on line 41—41 Fig. 1 and showing one of the arms of the nut supporting reels about to enter the same.

Figure 42 is a similar view showing a nut supporting arm of the reel leaving the cleaning chamber.

Figure 43 is a fragmentary vertical longitudinal section, showing a modification of the means for operating the shutters of the mechanism which controls the passage of the blank nuts from the supply chute to the threading mechanism.

Figures 44 and 45 are vertical transverse sections taken on lines 44—44 and 45—45 respectively in Fig. 43.

Figure 46 is a fragmentary horizontal section taken on line 46—46 Fig. 10, and showing the shutters in their closed position.

Figure 47 is a similar view showing the shutters in their open position.

Figure 48 is a fragmentary horizontal section, on an enlarged scale, showing the manner in which a nut laden carrier pin passes the curtain at the entrance of the nut cleaning compartment.

Figure 49 is a similar view showing the part of the curtain which normally closes the exit of the cleaning chamber through which the nut laden pins pass.

Figures 50 and 51 are fragmentary rear elevations of the detent means for preventing the nuts from sliding forwardly on the tap shank at predetermined times.

Figure 52 is a fragmentary horizontal section taken on line 52—52 Fig. 35.

In the following description similar characters of reference indicate like parts in the several figures of the drawings.

The numeral 50 represents the stationary front part of the main frame of the machine which may be of any suitable construction for supporting the several working parts of the machine in their operative relation.

In its general organization this machine comprises means for cutting the thread in the bore of a screw nut 51; means for guiding the nuts to and from the tapping means, and also guiding and rotating the same while in engagement with the screw threading tap; means for feeding nuts successively to the tapping mechanism; means for centering the tap and its shank in an operative position; means for controlling the movement of the nuts over the tap shank during the operation of the machine; means for creating a space between the tapped nuts on the tap and the train of nuts preceding them; means for flushing out chips as soon as they are made; means for alternately holding the tap shank so as to retain the tap in its central operative position but permit the nuts to move lengthwise over the tap shank; means for regulating the number of nuts which pass over the tap shank and in between the upper and lower holding jaws; and means for washing, cleaning and drying the nuts after the same have been tapped.

Figure 3:
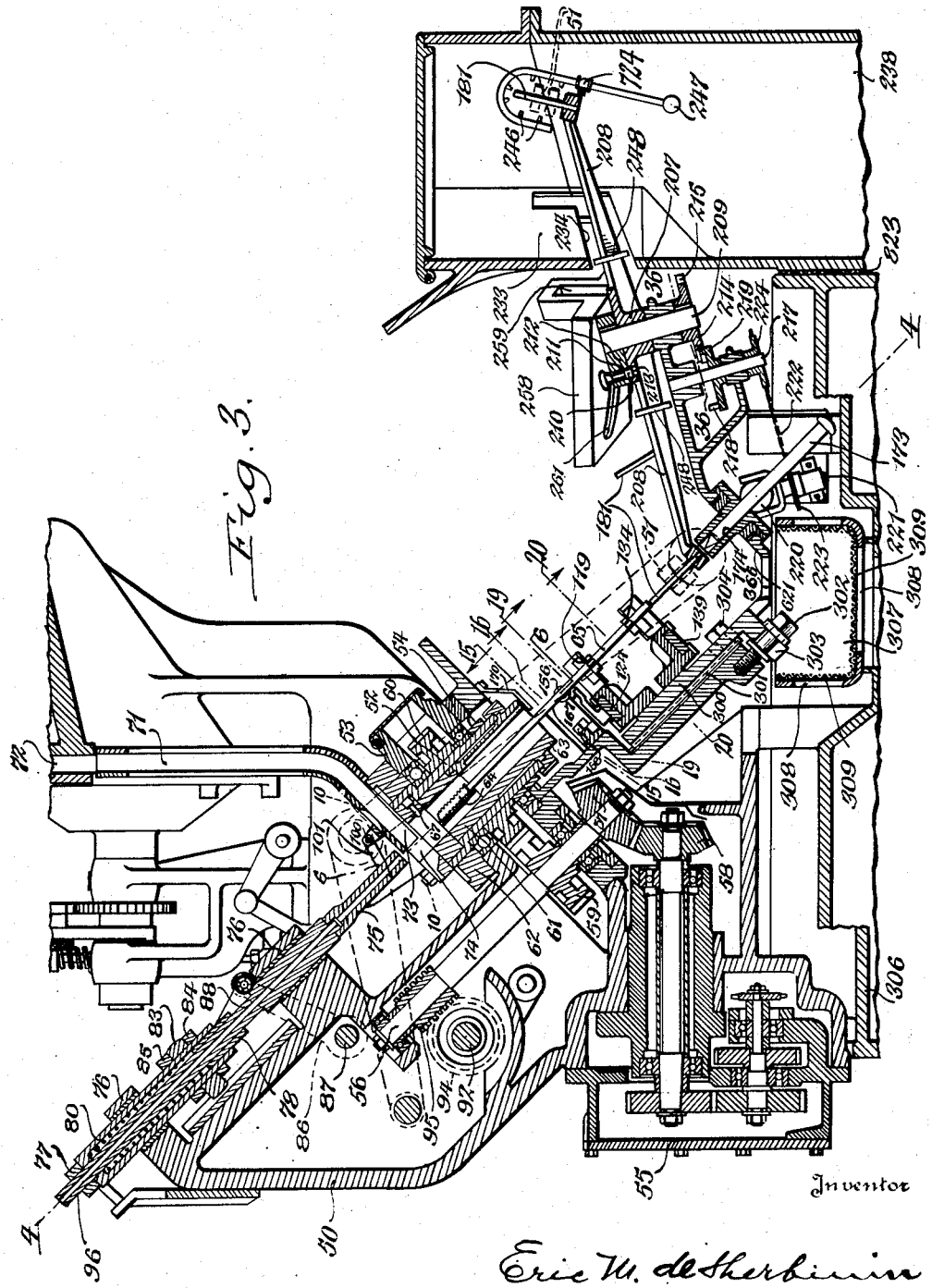
Figure 3 is a fragmentary vertical longitudinal section of the main working parts of the machine, on an enlarged scale, taken substantially on line 3—3 Fig. 2.

The mechanism for tapping the nut and rotating and guiding the same before and after the tapping operation and also while being tapped, is best shown in Figs. 3, 6 and 7 and constructed as follows:

The numeral 52 represents a tubular driving spindle or shaft which is journaled by means of ball bearings 53, 54 or otherwise on the upper part of the stationary main frame, so that this shaft is inclined to a horizontal plane, preferably 45°, and the front end of this shaft is uppermost and the rear end thereof lowermost.

This spindle may be rotated by any suitable means, but in the preferred construction motion is transmitted to this spindle from a horizontal driving shaft 55 journaled in the lower part of the main frame through the medium of an inclined intermediate shaft 56 journaled on the main frame parallel with the driving spindle and operatively connected by means of intermeshing bevelled gear wheels 57, 58 on the rear ends of these shafts, and a driving gear pinion 59 on the intermediate shaft 56 meshing with a gear wheel 60 on the driving spindle, as shown in Fig. 3.

Within the central part of this driving spindle is arranged a driving bushing 61, the front part of which contains a shunting collar 62, and the rear part of which contains a guide bushing 63. Arranged axially and lengthwise within the driving bushing is a screw threading tap or cutter 64, which latter is provided at its rear end with a reduced shank 65 extending through the guide bushing and beyond the rear end of the same where the shank is adapted to be held by means which will be described hereinafter for holding the tap against turning but permitting the nuts to pass lengthwise over the same. In its bore the driving bushing is provided with a plurality of lands 66 which are adapted to engage with the corners of the nut for compelling the same to turn with the driving bushing and driving spindle and which also operate to guide the nut lengthwise of the tap, as more fully set forth in U. S. Patent application Ser. No. 674,719.

The nuts to be fitted are introduced through the shunting collar which is provided with a plurality of yielding members 67 which operate to prevent the corners of the nuts from engaging with the lands in the driving bushing and clogging the machine. These shunting members are preferably constructed in the form of pins 67, which are arranged in an annular row around the bore of the shunting collar and each slidable radially in a guide way 68 in the adjacent part of the shunting collar. In its operative position each of these shunting pins has its inner conical end 69 arranged in front of one of the driving lands 66 and is yieldingly held in this position by means of a spring 70 interposed between the rear of this pin and the bore of the driving spindle 52, as best shown in Figs. 6 and 7.

If the corner of a nut, upon being fed to the shunting collar, should be in line with a land of the driving bushing, this corner will engage with the conical end 69 of one of the shunting pins and the latter, by the wedge action of this conical end, will turn the nut about its axis sufficiently to carry the corner of the nut away from the respective land of the driving bushing and thus permit the nut to enter the driving bushing and over the tap without liability of clogging the machine, as fully described in said patent application.

Various means may be employed for supplying the blank nuts to the front of the inlet end of the shunting collar, but it is preferable to employ for this purpose a chute having an upright upper portion 71 which receives blank nuts from a supply hopper 72, and a lower inclined portion 73 which is arranged in front of the shunting collar and at right angles to the axis of this collar and the driving bushing and guide bushing, as shown in Fig. 3. The lowermost nut of the column, series or tier arranged within the chutes 71 and 73 during the normal operation of the machine rests on a shoulder 74 at the bottom of the chute, and from this position the successive lowermost nuts of the column are successively pushed forwardly from the chute into the shunting collar by means of a plunger 75 which is arranged axially in line with the shunting collar and driving and guide bushings. This plunger is reciprocated by actuating means which are of a yielding character so that when the forward movement of the plunger is resisted to a moderate extent a yielding pressure can be applied to the plunger and the nut with which the same engages. The extent of this yielding pressure is, however, limited and when the same is exhausted then the forward pressure against the plunger becomes positive.

For this purpose the actuating mechanism of the plunger is constructed as follows:
The rear part of the plunger is guided in suitable ways 76 on the main frame and on its rear end the same is provided with a stop or shoulder 77 consisting preferably of a screw nut affixed to the plunger. On the intermediate part of the plunger a screw sleeve 78 is mounted by means of a screw joint 79. Surrounding the rear part of the plunger is a tubular follower or casing 80 which is adapted to bear at its rear end against the shoulder 77, and has its front part surrounding the adjusting sleeve 78. Between the plunger and the casing 80 is arranged a coil spring 81 which bears at its front end against the rear end of the adjusting sleeve 78 while its rear end bears against an internal forwardly facing shoulder 82 on the casing 80. In front of the internal forwardly facing shoulder 82 of the follower 80 the plunger 75 is provided with an external rearwardly facing shoulder 821 which normally is spaced from the shoulder 82 but is adapted to be engaged by the same when the forward movement of the plunger is resisted abnormally.

Upon the exterior of the follower or casing 80 is mounted a cross head 83 which is capable of adjustment lengthwise of the casing by means of adjusting screw nuts 84, 85 having threading engagement with the follower or casing 80 and bearing respectively against the front and rear sides of the cross head, as best shown in Figs. 4 and 12. By turning the screw nuts 84 and 85 in one direction or the other the plunger may be shifted to suit the height of the nut which is to be tapped, and by turning the screw sleeve 78 in one direction or the other the tension upon the spring 81 may be adjusted as best suits the particular nuts which are being tapped.

Figure 1:
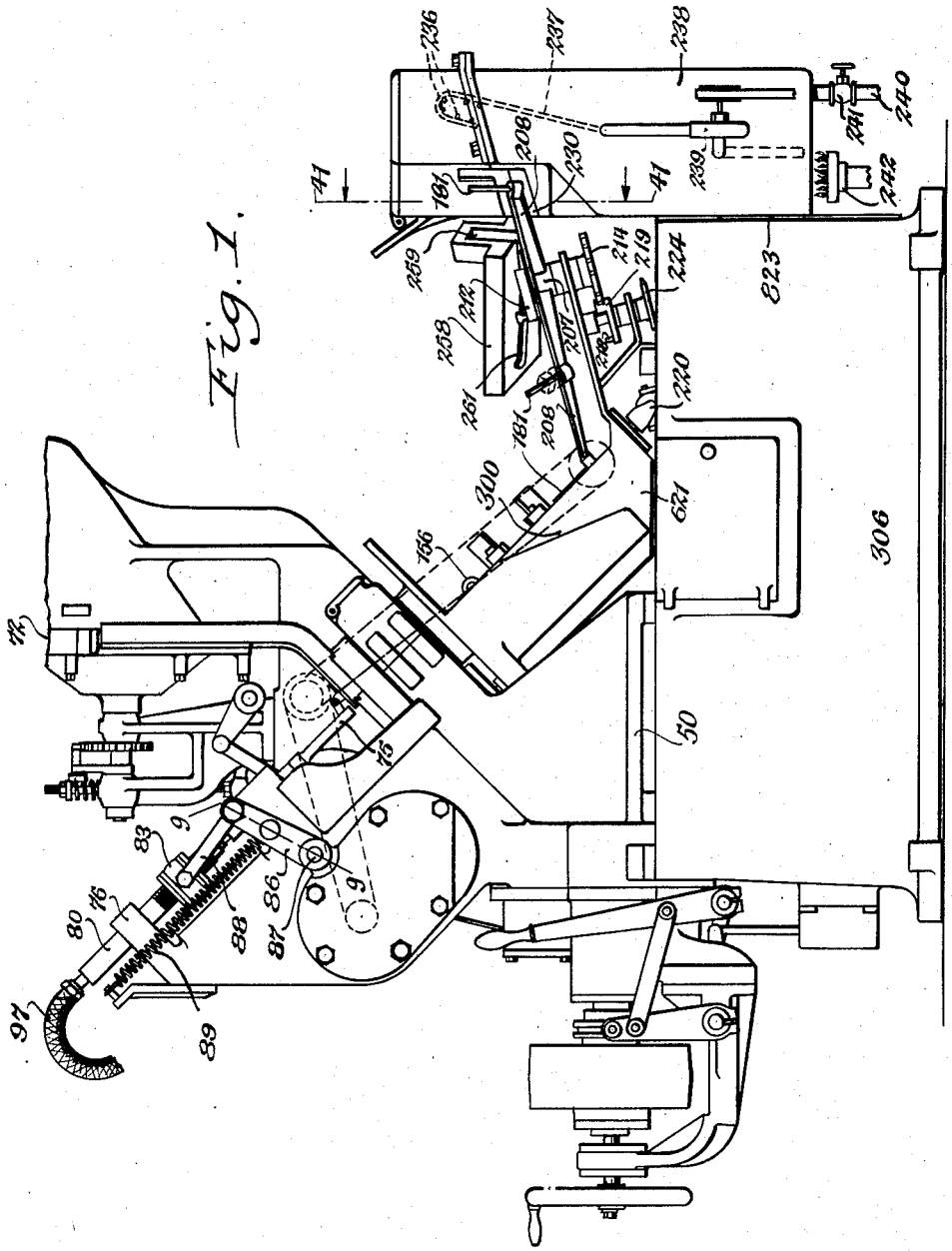
Figure 1 is a side elevation of my improved nut threading machine.
Figure 2:
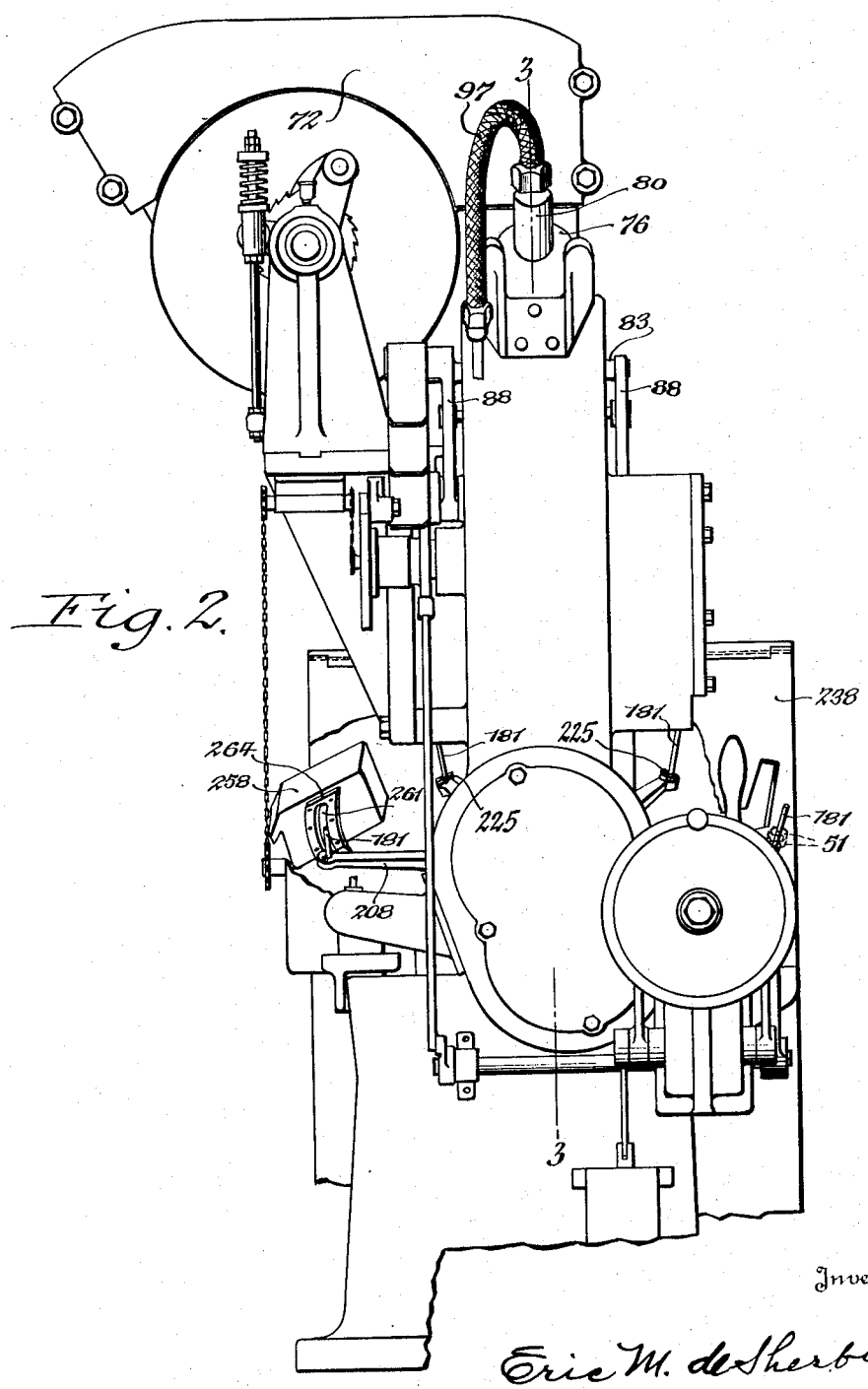
Figure 2 is a front end elevation of the same.

A longitudinally reciprocating movement is imparted to the plunger by means which preferably comprise two rock arms 86 arranged on opposite sides of the plunger and connected at their lower ends with opposite ends of the rock shaft 87 which is journaled on the adjacent part of the main frame, while the upper ends of these rock levers are connected by means of links 88 with opposite sides of the cross head 83, springs 89 connecting the rock arms 86 with the adjacent 45 part of the main frame and operating to move the plunger yieldingly rearward, a cam arm 90 secured to one end of the rock shaft 87 and provided with a cam roller 91, a cam shaft 92 journaled transversely in the main frame and provided at one end with a nut feed cam 93 which is adapted to engage with the cam roller 91 and positively move the plunger forwardly, and a worm wheel 94 secured to the other end of this cam shaft 92 and meshing with a worm 95 on the adjacent part of the intermediate shaft 56, as best shown in Figs. 1, 3 and 9.

As the plunger moves forwardly its front end engages the lowermost nut in the supply chute and pushes the same forwardly from the chute to the shutters 98 and then into the shunting collar 62 and into engagement with the front end of the screw threading tap, and during this time the plunger holds up the remaining nuts in the chute. As the plunger is retracted into its rearmost position in which its front end clears the column of nuts in the chute, as indicated in Fig. 3, then the weight of the nuts in the supply chute causes the same to descend by gravity and bring the lowermost nut of the column into position between the plunger and the shutters 98 and the shunting collar, preparatory to being fed to the threading mechanism.

The throw of the cam 93 is preferably such that it is in excess of the requirement to feed the lowermost nut from the supply chute to the tap and presses the same forwardly on the latter a sufficient length of time until the whole thread or nearly so has been cut in the bore of the nut. Due to the excess throw of the feed cam 93 the spring 81 will be compressed during each forward stroke of the tubular follower 80 and thereby exert a yielding pressure against the nut while on the tap. If however the nut should become jammed in the machine and hold back the plunger 75 then the follower 80 would move forwardly independently of the plunger until the shoulder of the follower engages the shoulder 821 of the plunger after which the plunger would be forced to move.

The cam also has a throw which is faster than the pitch of the spiral thread cutting teeth or bit of the tap so as to prevent the nut from dragging or lagging behind the feeding effect of the tap on the nut and avoiding any pulling in the action of the tap on the blank nuts. As a result of thus feeding the nut with a yielding forward pressure over the tap and not only avoiding distorting of the threads on the nut, but also preventing the nut from lagging behind, the feeding effect of the spiral cutting teeth of the tap is such that shaving of the threads of the nut is avoided on both the front and rear sides of the same, either by excessive push or excessive retarding of the plunger, and instead the plunger is merely floated or cushioned and a correct angle, pitch diameter or lead of the nut threads is produced which causes the same to fit tightly on bolts, studs and the like and thus renders the same particularly suitable for use in machinery and elsewhere requiring high grade and accurate screw nuts.

For the purpose of cooling the tap and the nuts as the same become hot during the operation of threading the latter, and also for the purpose of carrying away the chips of metal which are formed during the threading operation, a stream of coolant of any suitable fluid either in the form of air, liquid or both is introduced lengthwise into the shunting collar, driving and guide bushing, and against the tap and the nuts thereon from the front side of these parts, this being preferably accomplished by providing the plunger 75 with a longitudinal passage 96 and connecting the rear end of the same by means of a hose 97 with a source which supplies coolant under pressure. The coolant flows forwardly through the plunger and is discharged from the front end of the latter against the tap and nuts, and operates not only to cool the same but also carries the chips which are formed in the threading operation forwardly through the driving and guide bushing to the rear end of the latter where the chips may be disposed of in any suitable manner.

Between the rear side of the nut outlet at the lower end of the nut supply chute and the front side of the shunting collar is arranged a shutter mechanism which operates to support the successive lowermost nuts of the column in an inclined position in which the axis of each lowermost nut is in line with the axes of the shunting collar, driving bushing and guide bushing, and the screw threading tap, and retains the same in this position until it is advanced or moved forwardly by the plunger into engagement with the tap and thus insures proper feeding of the nuts to the tap without liability of tipping the nuts and producing imperfect workmanship or clogging the machine.

In its preferred form this shutter mechanism, as best shown in Figs. 6, 10, 11 is constructed as follows:

The numeral 98 represents two shutters arranged in an inclined position at right angles to the axis of the plunger and screw threading tap, and between the rear side of the lower part of the nut supply chute and the front side of the shunting collar. These shutters are pivoted at their upper ends by means of screws 99 or otherwise to the rear side of the nut chute, so that the lower parts of these shutters may be moved toward and from each other for the purpose of bringing the opposing lower edge portions of the same either into the path of the lowermost nut of the column, as shown by full lines in Fig. 10, and thus obstruct the forward movement of the lowermost nut which is resting against the same, or these shutters may be moved laterally away from each other so that the same clear the path of the lowermost nut and permit the latter to be moved by the plunger from the nut chute toward the screw threading tap. The laterally swinging movement of the shutters may be effected by various means, and the motion for this purpose may be derived from any suitable moving part of the machine, but in the preferred construction this is accomplished as follows:

The numeral 100 represents a horizontal shutter rock shaft which is journaled in suitable bearings on the front side of the nut chute and provided with a depending actuating arm 101 and also with two forwardly projecting shifting arms 102. Each of the shifting arms is preferably constructed of spring metal and secured at its rear end to the rock shaft 100, while its front end engages with a cam groove or guideway 103 on the front side of one of the shutters 98. The shutter shaft may be rocked by means of a longitudinally reciprocating shipper rod 104 which is slidably mounted on the stationary parts of the frame which has guideways 76, and is provided at its front end with a shifting pin 105 which fits a fork 106 on the lever end of the actuating arm 101, as best shown in Fig. 11. On its rear part the shipper rod 104 is provided with two spaced tappets 107, 108 which are adapted to be alternately engaged by the opposite sides of the cross head 83 through which the shipper rod may slide, and which forms part of the means for actuating the plunger 75, as shown in Figs. 11 and 12.

This shutter operating mechanism is so timed that during the forward movement of the plunger the shutters will be moved apart and out of the path of the plunger, so that the latter can push the nut from the chute toward the threading tap, and during the backward movement of the plunger the two shutters will be moved toward each other for the purpose of obstructing the path of the nuts and causing the inner opposing edge portions of the shutters to form a support for the marginal part of the lowermost nut and support the latter in an inclined position with its axis in line with that of the plunger and the tap.

Inasmuch as the natural tendency of the nut, due to gravity, is to assume an inclined position with its rear side against the front side of the shutters, all liability of the nuts tipping forwardly while in the lowermost part of the chute is avoided, thereby insuring a presentation of the blank nuts at all times in the proper position for engagement by the plunger, preparatory to being advanced in the threading tap. As a result liability of improper presentation of nuts to the tap is prevented, thus avoiding clogging of the machine.

Each of the shutters of the shutter mechanism is bowed forward slightly and is placed under tension so that its lower end bears yieldingly against the adjacent transverse face 109 on the lower rear side of the nut supply chute. The central part of this bearing face 109 is provided with an inner stop 110 which is engaged on opposite sides by the lower opposing inner edges of the shutters when the latter are in their innermost or closed position, as shown in Figs. 10 and 46, in which position of the shutters the central parts of their inner opposing edges project into the path of the marginal parts of the nuts and hold the latter against forward movement. The outward movement of the shutters in which their opposing edges are moved away from each other is limited by outer stops 111 mounted on the adjacent part of the rear wall of the nut chute, and these outer stops are adapted to be engaged by the outer edges of the shutters, while the latter are spread apart to their fullest extent and their inner edges are moved apart far enough to clear the path of the blank nuts, and permit the same to be pushed forwardly by the plunger. The inner stop 110 and the outer stops 111 are comparatively long so that the same are at all times in the path of the shutters and limit the inward and outward movement thereof.

Intermediate of each of the outer stops 111 and the inner stop 110 a detent pin or projection 112 is arranged on the rear side of the rear chute wall, which detent pin is shorter than the inner and outer stops 110, 111.

In the inward position of both of the shutters their opposing inner edges engage with opposite sides of the inner stop 110, and their outer edges engage with the inner sides of the detent pins 112, as shown in Fig. 46, whereby the shutters are positively held against inward and outward movement. While the shutters are in this position the lowermost nut of the column in the chute engages its front or advancing end with the front side of the shutters and is supported by the latter in a position in which the same is inclined and has its axis in line with that of the tap.

As the plunger advances it engages its front end with the rear side of the nut and pushes it from the lower end of the column in the supply chute rearwardly toward the tap while the face of the nut is square to the tap, together with the lower parts of the shutters, and during the last part of this forward movement of the plunger its cross head 83 engages with the front tappet 107 so as to rock the shaft 100 in the direction for raising the spring arms 102, which latter move at their front ends upwardly in the cam shaped guideways 103 of the shutters 98, while the latter are still in engagement at their outer edges with the detent pins 112.

During such upward movement of the spring shifting arms 102 in the cam ways 103 these spring arms are sprung toward each other and put under tension. This action continues until the plunger has moved the nut and the lower ends of the shutters forwardly far enough to disengage the outer edges of the latter from the detent pins 112, and when this occurs the resilience of the spring arms 102 quickly draws the two shutters transversely outward away from each other, and out of the path of the peripheral parts of the nut, so that the latter is free to be pushed forwardly into the shunting collar and driving bushing and into engagement with the front part of the tap while the face of the nut is square to tap, so that the latter now has control of the nut and operates thereon to cut a thread in the bore thereof, and also moves the nut lengthwise to the rear of the tap and on to the shank thereof.

During the forward movement of the plunger the same moves idly during the first part of such movement, while its cross head 83 is moved out of engagement from the rear tappet 108 of the shipper rod 104 and until it engages with the front tappet 107 of this rod, during which movement the plunger moves from its rearmost position in front of the nut chute into a position in which it engages the front side of the nut and pushes the same.

During the first part of the backward movement of the plunger the cross head 83 of the same moves idly from the front tappet 107 to the rear tappet 108 without effecting the shutters, and during such movement of the plunger the same has its front part still arranged between the two shutters. During the last part of the retracting or backward movement of the plunger its cross head 83, by engaging the rear tappet 108, causes the shutter shaft 100 to be turned in the direction for lowering the front ends of the spring arms 102, so that the latter by sliding downwardly in the cam ways 103, cause the two shutters to engage with opposite sides of the front part of the plunger.

As the plunger continues its rearward movement while the shutters are still engaging with opposite sides thereof, the spring arms 102 by sliding down the cam ways 103 are sprung outwardly and put under tension. As soon, therefore, as the front end of the plunger moves backwardly far enough to clear the shutters the latter are instantly moved inwardly in their innermost position against opposite sides of the inner stop 110, so that the inner edge portions of these shutters are arranged in the path of the marginal parts of the nut blanks and serve to support the next following lowermost nut of the column in the chute which drops to the bottom of the chute and against the front side of the shutters the instant the plunger has been moved backwardly far enough to clear the column of nuts.

As the shutters are quickly moved toward each other by the spring arms the instant these shutters clear the front end of the plunger, the lower ends of these shutters also move forwardly toward the plunger due to the resilience of the shutters so that the lower ends of the same are again engaged at their outer edges with the inner sides of the detent means 112, as shown in Fig. 46, preparatory to being disengaged therefrom during the next following forward feeding operation of the plunger on the succeeding nut.

By this means the shutters are opened and closed quickly by snap action so that the throat or passageway from the nut chute to the tap is obstructed by the shutters and the latter form a support for the nuts until they are quite close to the tap, and this throat or passageway is also promptly closed upon withdrawal of the plunger, so that no blank nuts are permitted to enter this throat in an improper position which otherwise might cause clogging of the machine.

As the nuts of the column in the supply chute successively near the bottom of the latter they are immediately thrown by the stream of coolant against the front side of the shutters and held there in a position at right angles to the axis of the tap and plunger, which positioning of the nut is facilitated by the natural tendency of the nut to rest against the shutters due to the angular position of the same relative to the horizontal. The stream of coolant in the form of air, liquid or both therefore assists in holding the nut axially in line with the tap and plunger instead of possibly tilting the nut out of place as has been the case heretofore when the tap was arranged horizontally. As the stream of coolant and air now aids in holding the nut in place preparatory to threading, the coolant may be supplied under greater pressure so that the increased volume of coolant serves to wash or blow the chips more thoroughly from the nuts and tap and also keeps the same cooler. To permit such increased flow of coolant the inner edges of the shutters are provided with notches 98I adjacent to these parts which are engaged by the marginal parts of the nuts, as shown in Fig. 10.

By the use of this shutter mechanism improper presentation of nuts to the tap is prevented, and the use of coolant under higher pressure is possible which permits of running the machine faster and increasing its output.

By inclining the tap the force of gravity with the assistance of the coolant pressure causes the nuts to move freely off the rear end of the tap and thus avoids any action of one nut on the tap pushing or crowding a preceding nut from the tap, thereby leaving the last thread of the nut full and perfect instead of distorting, burring or marring the same and necessitating further finishing or correcting operations on the same.

In order to hold the tap and shank against turning and also permit the threaded nuts to pass lengthwise of the shank and escape from the rear end thereof while the machine is in operation, means are provided for alternately engaging and holding the shank at different points in the length thereof, which means comprise front and rear holding mechanisms which are constructed and operated as follows:

The shank of the tap is provided on that part thereof about midway between the rear end of the nut driving spindle and the rear end of the shank with two gripping or holding faces 113, 113 on horizontally opposite sides thereof, forming front and rear shoulders 114, 115 at the front and rear ends of each of these faces; and adjacent to the extreme rear end of the shank the same is provided on horizontally opposite sides with rear vertical gripping or holding faces 116, each of which forms front and rear shoulders 117, 118 at the front and rear ends of each of these last-mentioned flat faces, as best shown in Figs. 13 and 14.

On horizontally opposite sides of the front holding faces 113 of the shank are arranged two front shank holding jaws 119, 120 which are provided on their opposing inner ends with flat bottomed notches 121, 122 which are adapted to engage with the flat faces 113 of the shank for holding the same against turning, as well as holding it against moving vertically, and also holding the shank and tap against lengthwise movement. The rotary movement of the shank is prevented due to the engagement of the flat bottom of the notches 121, 122 with the flat faces 113 of the shank, vertical movement of the shank is prevented by the upper and lower parts of these jaws overlapping the upper and lower sides of the shank, and longitudinal movement of the shank is prevented by engagement of the front and rear shoulders 114 and 115 with the front and rear sides of the jaws 119 and 120 when the latter embrace the tap shank.

The two holding jaws 119, 120 are adjustably mounted upon two horizontally movable slides 123, 124 which are guided in suitable ways 125, 126 on the rear part 621 of the main frame, which latter is preferably capable of longitudinal adjustment relative to the stationary front part of the main frame for a purpose which will appear later on. These slides 123, 124 are preferably arranged one above the other and are actuated so that they move alternately in opposite directions for the purpose of engaging the jaws 119, 120 with the tap shank, or disengaging the same therefrom. These jaws are moved out of engagement from the tap shank by yielding means such as springs, one of which 127 connects the upper slide 123 with the adjacent part of the adjustable frame section 621, and the other 128 connects the lower slide 124 with the adjacent part of this frame section, and the movement of these holding jaws toward the tap shank is effected by positively operating means consisting preferably of one rotary cam 129 engaging with a roller 130 on the slide 124, and another rotary cam 131 engaging with a roller 132 on the other slide 123. The cams 129, 131 are mounted on a rotary cam shaft 133 which is journaled in bearings on the adjacent part of the adjustable frame section 621 and may be driven in any suitable manner and from any suitable source, so that the holding jaws 119, 120 operate at the proper time.

On horizontally opposite sides of the rear part of the tap shank are arranged two rear holding jaws 134, 135 which are provided respectively with flat bottom notches 136, 137 adapted to be engaged with and disengaged from the flat rear holding faces 116 of the tap shank. The flat bottom of the notches 136, 137 upon engaging the flat faces 116, hold the shank and tap against turning, and the parts of the jaws 134, 135 forming upper and lower sides of these notches overlap the upper and lower sides of the shank and thereby hold the same against vertical movement, and the front and rear sides of these jaws, by engaging with the front and rear shoulders 117, 118 of the shank, hold the latter against longitudinal movement, as best shown in Fig. 20.

The rear holding jaws 134, 135 are mounted respectively on oppositely moving slides 138, 139 which are guided in horizontal transverse ways 140, 141 arranged one above the other on the adjustable rear frame section 621 and outward movement of these jaws is effected by yielding means consisting of springs, one of which 142 connects an arm 143 on the slide 138 with an anchoring pin 144 on the frame section 621, and the other spring 145 connecting an arm 146 on the slide 139 with an anchoring pin 147 on this frame section, as best shown in Fig. 20.

The inward movement of the rear jaws 134, 135 is effected by positive actuating means consisting preferably of two rotary cams, one of which 148 engages with a roller 149 on the upper slide 138, and the other cam 150 engaging with a roller 151 on the slide 139. The cams 148 and 150 are also mounted on the cam shaft 133 so as to be rotated in unison therewith from the same source.

The timing of these two pairs of cams 129, 131 and 148, 150 is such that the pair of holding jaws 119, 120 and the pair of holding jaws 134, 135 are alternately engaged with the tap shank, but each pair of these jaws retains its hold on the tap until the other pair grasps the tap before the first mentioned pair releases its grip on the tap, whereby the shank is always held by one or other of these pairs of jaws, and the shank and tap are always maintained in the properly centered position in the machine for permitting a nut to be rotated in engagement with the tap by the driving spindle for producing a thread in the bore of the nut, and also permitting the threaded nuts to move intermittently lengthwise over the shank and ultimately escape from the rear end thereof.

For this purpose the pairs of cams 129, 131 and 148, 150 are so timed that each pair of holding jaws retains its grip on the tap shank until the other pair of jaws has been moved into engagement on the opposite sides of the shank and firmly grips the same before the first-mentioned pair of holding jaws are moved away from opposite sides of the shank, from which it will be clear that the gripping effect of the two pairs of jaws overlap one another, and these two pairs of jaws are never out of engagement with the tap shank at the same time.

In front of the front shank holding mechanism is arranged a detent mechanism which operates to hold back the train of threaded nuts which are arranged upon the tap shank in front of the jaws of the front tap holding mechanism, while these last-mentioned jaws are moved into engagement with the shank, and thereby prevent any nuts at this time from occupying that part of the tap shank which is to be engaged by the forward pair of holding jaws, so that the latter are free to engage the tap shank and hold the same against motion and insure proper operation of the machine.

This detent mechanism in its preferred form is best shown in Figs. 3, 4, 17, 18, 21—31 and 50—51, and constructed as follows:—

The numerals 152, 153 represent two detent jaws which are movable horizontally toward and from opposite sides of the tap shank immediately in front of the holding jaws 119, 120 and are guided in transverse guideways 156, 157 mounted on a standard or bracket 167 arranged on the adjacent stationary part of the main frame. These detent jaws are yieldingly moved toward horizontally opposite sides of the tap shank by means of springs 158, 159 arranged between the outer ends of these detent jaws and the outer ends of the guideways in which these jaws slide, as shown in Figs. 4 and 16.

The jaw 152 is moved horizontally away from the tap shank in unison with the disengagement of the holding jaw 120 from the tap shank by means of a tappet or shifting pin 160 mounted on the slide 124 and engaging with the inner side of a shifting lug 161 projecting downwardly from the jaw 152, as shown in Figs. 4, 16, 17 and 50. The other detent jaw 153 is moved horizontally away from the tap shank by motion which is also derived from the slide 124 as the holding jaw 120 is moved away from the tap shank, the motion for this purpose being transmitted through the medium of an upright rock lever 162 pivoted on the standard or bracket 167 and having its lower arm engaged by a tappet 163 on the slide 124, while its upper arm engages with the inner side of a shifting lug 164 arranged on the side of the detent jaw 153, as best shown in Figs. 4, 16, 18, 19 and 51.

As the two jaws 119, 120 move away from opposite sides of the tap shank the tappet 160 on the slide 124, by engaging the lug 161, also moves the detent jaw 152 away from one side of the tap, and the other tappet 163 on this slide by rocking the lever 162 also moves the other detent jaw 153 away from the opposite side of the tap shank. As the two front holding jaws 119, 120 move toward opposite sides of the tap shank for the purpose of gripping the same the tappets 160 and 163 on the slide 124 operate to release the detent jaws 152, 153 and permit the springs 158, 159 to move these detent jaws toward opposite sides of the tap shank. If no nuts are present on the tap shank in line with the detent jaws during such inward movement of the latter, then these jaws terminate their movement close to opposite sides of the tap shank, so that these detent jaws are in the path of any nuts which may be discharged from the shank, and thus hold such nuts temporarily against further forward movement, and prevent them from getting in between the front holding jaws 119, 120 while the latter are being moved for engaging the tap shank.

If, however, a nut should be present on that part of a tap shank which is in line with the detent jaws while the latter are moving toward opposite sides of the shank, then such nut will be engaged on opposite sides of its periphery by the detent jaws and held against further forward movement on the shank and prevented from getting in between the front holding jaws 119, 120 while the latter are moving into engagement with the tap shank.

During such engagement of the detent jaws with opposite sides of a nut the springs 158, 159 are compressed during the movement of the slide 124 up to the end of its stroke, but after these jaws engage the respective nut the guideways 156, 157 in which these jaws are mounted, continue their movement toward each other independently of these jaws up to the end of the respective stroke of the slide 124 which is positively actuated by the cam 129. During the subsequent return stroke of the slide 124 both guides 154, 155 are again moved in their outermost position and the detent jaws 152, 153 are projected relative to the guides 154, 155, after which these detent jaws move outwardly with these guideways up to the end of the outward strokes of the latter.

The two detent jaws 152, 153, the guideways in which the same slide, together with their springs, the lever 162 and the standard or bracket 167 are capable of longitudinal adjustment on the stationary front part of the main frame in a direction parallel with the axis of the tap shank and held in its adjusted position by means of a pair of clamping screws 168 passing through longitudinal slots 169 on the bracket 167, as shown in Figs. 4 and 16.

Various means may be provided for adjusting the jaws 119, 120 of the front shank holding device and the jaws 134, 135 of the rear shank holding device in order to enable the same to properly grip the shank, and various means may also be employed for adjusting the draw of the detent jaws 152, 153 so that their inner ends may be positioned to properly grip nuts of different sizes or diameters, but this adjustment is preferably effected by the means which are shown in Figs. 16, 17, 18, 19, 20, 50 and 51, and constructed as follows:

The numeral 182 represents a bolt passing through the upper part of the slide 124 and through a horizontal longitudinal slot 183 in the jaw 120, whereby said jaw may be adjusted horizontally into the desired position relative to one side of the tap shank 65. A similar bolt 184 passes through the slide 125 and through a horizontal longitudinal slot 185 in the jaw 119 so that the jaw 119 may be adjusted with reference to the other side of the tap shank, as shown in Fig. 19.

For the purpose of adjusting the rear gripping jaws 134, 135 on their slides 138, 139 adjusting bolts 186 and 187 are provided, the former of which passes through a longitudinal slot 188 in the jaw 134 and into the adjacent part of the slide 138, while the latter passes through a horizontal longitudinal slot 189 in the jaw 135 and into the adjacent part of the slide 139, as shown in Fig. 20.

The tappet 160 which operates the holding jaw 152 is adjustable horizontally with reference to the slide 124 by shifting the same in a horizontal slot 190 in a bracket 191 secured to the slide 124, and a clamping nut 192 whereby this tappet is held in position on this bracket after adjustment. The fulcrum 193 of the intermediate lever 162 is adjustable horizontally in a slot 194 in the bracket or standard 167 and held in place after adjustment by means of a clamping nut 195.

In order to adjust the limit of the inward stroke of the holding jaw 152 toward the shank and the path of the screw nuts a stop 196 is provided which is adapted to be engaged by the inner side of the shifting lug 161 on the jaw 152, and this stop is adjustably connected with the adjacent part of the standard 167 by means of a screw 197 passing through a horizontal slot 198 in the stop 196 and into the adjacent part of the standard 167, as shown in Figs. 16, 17 and 50. The limit of the inward stroke of the detent jaw 153 toward the path of the screw nuts and the tap shank may also be adjusted by means of a stop 199 adapted to be engaged by the inner side of the shifting lug 164 on the jaw 153, and a screw 200 passing through a horizontal slot 201 in the stop 199 and into the adjacent part of the standard 167, as shown in Figs. 16, 18 and 51.

A temporary stop device is provided which is adapted to engage with the foremost nut of a train arranged on the front part of the tap shank, while this train is within the guiding bushing of the driving spindle, and thereby retains the front part of the shank and the tap thereof in a central position within the guiding and driving bushing, and permits the rear part of the tap shank to be centered while setting up the machine preparatory to operating the same. This temporary setting up stop in its preferred construction consists of a stop arm 170 pivoted on the upper part of the stationary front frame section adjacent to the rear end of the driving spindle by means of a horizontal longitudinal pivot pin 171 so that this stop may be either swung downwardly into its operative position into the path of the screw nuts which are on the front part of the shank, as shown in Figs. 15, 22, 26 or this stop may be swung into its inoperative position and against a supporting pin 172 on the stationary frame section, as shown by dotted lines in Fig. 15. While the tap and its shank are being thus centered in the machine the same are held against forward longitudinal movement by a temporary longitudinal end centering pin 173 which is calibrated and slides lengthwise in a guideway 174 on the lower part of the adjustable frame section 621 axially in line with the driving spindle. This centering pin 173 fits in its guideway sufficiently tight so that the same will be retained frictionally in whatever position the same may be shifted. When pushed upwardly into engagement with the lower or rear end of the tap shank, as shown in Figs. 4, 22, 26 this pin has its front end so arranged that it is engaged by the rear end of the tap shank at a point in rear of the lower pair of holding jaws and supports the shank and tap against forward longitudinal movement while setting up the machine.

After the upper and lower pairs of tap holding jaws 119, 120 and 134, 135 and the means for actuating the same have been so adjusted that they prevent longitudinal movement of the tap and its shank, then the centering set-up pin 173 is moved rearwardly away from the rear end of the shank, as shown by full lines in Figs. 27-31, so that the threaded nuts can escape from the rear end of the tap shank.

In order to center that part of the tap shank in rear of the driving spindle in the proper position transversely and horizontally relative to the axis of the driving spindle, a gage device is provided which is used temporarily and which comprises in its preferred form a transverse gage bar 175 which is provided at its opposite ends with angular shoulders 176 adapted to engage with angular gage faces 177 on the adjacent stationary front part of the main frame, and a gage fork 178 arranged on the central part of the gage bar 175 and provided with vertical gage lugs 179 which are arranged side by side and form between them a gage notch 180 which is adapted to receive the tap shank at a point immediately in rear of the driving spindle.

Upon placing this gage bar with its gage fork 178 over the shank tap and then seating its shoulders 176 on the gage faces 177 of the main frame, as shown in Fig. 15, the tap shank will be properly located transversely so that its axis will be in line with the axis of the driving spindle. While the tap shank is engaged by the gage fork 178 of the gage bar and the end centering pin 173 and the nut hold back stop 170 is shifted into a position in which it retains the train of nuts on the front part of the shank and within the driving spindle, the detent jaws 152, 153, the front pair of holding jaws 119, 120, and the rear pair of holding jaws 134, 135 and their actuating mechanism are adjusted so that these jaws are engaged with and disengaged from the parts which they are intended to grip at the proper time during the normal operation of the machine.

The method of setting up of the mechanism which alternately grasps the tap shank at different points in the length thereof, and the means for holding back the train of nuts in advance of the two holding jaws of the front holding mechanism, and the operation of these parts, after the setting up of the tap has been effected, is illustrated diagrammatically in Figs. 21-31 described as follows:

In the position of the parts shown in Fig. 21 the tap shank has been removed from the machine and no nuts are present in the same, in which position of the parts the temporary hold back stop 170 has been moved laterally out of the path of the nuts into an inoperative position, and the detent jaws 152, 153, front holding jaws 119, 120 and the rear holding jaws 134, 135 are all moved laterally outward or away from the axis of the tap shank, and the lower longitudinal centering pin 173 is also moved rearwardly into its inoperative position.

The operator now takes a tap 64 having a straight shank 65 and places a plurality of blank nuts 51 on the front part of the shank, which nuts may vary in number according to the size, but in the present case six of such nuts are shown on the front part of the tap shank. The tap and its shank with the blank nuts on the front part of the tap are now placed within the guide bushing of the driving spindle, as shown in Fig. 22, and the nuts thereon are held against moving forwardly lengthwise of the tap shank by turning the temporary stop 170 into a position in which its inner end will be arranged in the path of the train of nuts on the shank and the foremost nut of this train will engage this stop, as shown in Fig. 22.

Forward endwise movement of the tap and its shank are also prevented by pushing up the end centering pin 173 so that the front end of the latter engages with the rear end of the tap shank, as shown in Fig. 22. If desired, the centering pin 173 may be first engaged with the front end of the tap shank, and then the temporary stop 170 may be engaged with the front end of the train of nuts on the front part of the tap shank. The transverse gage device is now utilized for gaging the tap shank transversely with reference to the axis of the driving spindle by engaging the notch of the gage fork 178 with the tap shank immediately in rear of the temporary nut stop 170, as shown in Fig. 23, and also engaging the opposite ends of the bar of this gage with the gage faces 177 on the stationary part of the main frame, as shown by full lines in Fig. 15.

The cams 129, 131 are now adjusted so as to cause the slides 124 and 125 to move into their innermost position and the upper holding jaws 119 and 120 are adjusted transversely on the slides 125, 124 so that when these slides are in their innermost position the jaws 119, 120 will grip the front set of faces 113 of the tap shank on opposite sides of the latter, as shown in Fig. 24, and thereby hold the tap shank against turning and also against longitudinal movement. The detent jaws 152, 153 are now adjusted to the desired position on opposite sides of the tap shank between the gage 178 and the front holding jaws 119, 120 so that these jaws are arranged close to the tap shank and are also arranged in the desired position lengthwise of the axis of the tap shank to suit the size of the nut which is being threaded, as shown in Fig. 25.

The cams 148, 150 and slides 138, 139 of the rear tap holding mechanism are now so adjusted that these slides are in their innermost position and the jaws 134, 135 are adjusted so that they engage with opposite sides of the rear flat faces 116 of the tap shank, as shown in Fig. 26, and the cams 129, 131 of the front holding jaws 119, 120 are so timed relative to the cams 148, 150 of the rear holding jaws 134, 135 that after the rear holding jaws grip the tap shank the front holding jaws 119, 120 will be disengaged from the tap shank, as shown in Fig. 26, and the rear holding jaws will retain their grip on the tap shank until the front holding jaws have re-engaged the tap shank, after which the rear holding jaws are moved away from the tap shank so that the latter is always held by either one or the other of these two sets of holding jaws.

The centering pin 173 is now moved rearwardly into its inoperative position, as shown in Fig. 27, and the machine is ready to start normal operation of threading nuts. After the nuts have been threaded upon the tap the same pass on to the shank and ultimately escape from the rear end of the shank where they may be disposed of in any suitable manner. It is of course understood that when the machine is set up and in full operation that the gage 178 is removed and the stop 170 is shifted into its inoperative position.

Instead, however, of discharging the threaded nuts from the rear end of the shank to the floor of the machine, or into a receptacle or into a chute for subsequent disposition, the present machine is organized to deliver these threaded nuts to means which wash, clean and dry the screw nuts before they are discharged for packing, storing or shipping to the trade. This washing, cleaning and drying apparatus will be described later on and for the present purposes only the upright or carrying pins 181 of this cleaning apparatus will be considered, which pins are arranged in an annular row and are adapted to be successively moved into a position in which each carrying pin in turn stands axially in line with the tap shank at the rear end of the latter and is retained momentarily at rest in this position for a sufficient length of time to permit one or more threaded nuts to slide from the rear end of the shank to the respective carrying pin, after which the carrying pin which has just been loaded with nuts will be advanced another step and the next following carrying pin will be moved into a position in line with the rear end of the tap shank for receiving nuts from the latter.

In Fig. 27 one of the nut carrying pins 181 of the cleaning machine is shown in position for receiving screw nuts from the tap shank, and the latter is held adjacent to its rear end by the rear pair of holding jaws 134, 135, while the front holding jaws 119, 120 are disengaged from the tap shank, and the detent jaws 152, 153 are in their innermost position close to the tap shank, where they extend into the path of the screw nuts and are engaged on their front side by the foremost nut of the train of nuts 51 which has been placed upon the front part of the tap shank for the purpose of setting up the machine.

It is only while setting up the machine or when the supply of nuts to the threading tap is temporarily interrupted that any of the nuts on the shank of the tap engage their advancing faces or front sides with the lateral sides of the holding jaws 152, 153, as shown in Fig. 27. At all other times these detent jaws engage their front ends with the peripheral sides of the foremost nut of the train on the front part of the tap shank, as will presently appear.

Although the nuts appearing on the upper part of the tap shank have been placed thereon by the operator for setting up purposes, it will be assumed that these nuts are actually threaded on the tap 64 before reaching the shank, inasmuch as this will facilitate the further description of the operation of the machine. A nut is always on the tap before another is fed on by the plunger and therefore keeps the tap always centered and also keeps it from touching the sides of the driving bushing. As the machine continues its operation a blank nut is fed by the plunger 75 from the supply chute onto the tap, as shown in Fig. 28, and at the same time the front holding jaws 119, 120 are moved against opposite sides of the tap shank for gripping the same, while the detent jaws 152, 153 are moved out of the path of the train of nuts so as to permit the latter to slide forwardly by gravity on the tap shank and engage the foremost nut of this train with the front side of the front holding jaws 119, 120, as shown in Fig. 28, and thereafter the rear holding jaws 134, 135 are moved away from the opposite sides of the tap shank and out of the path of the nuts, as shown in the same figure.

During the next step in the operation of the machine which is indicated in Fig. 29, the rear pair of holding jaws 134, 135 first engage opposite sides of the tap shank and then the jaws 119, 120 of the front holding device are disengaged from the tap shank and moved out of the path of the train of nuts, but at the same time the detent jaws 152, 153 yieldingly engage with opposite sides of one of the nuts in rear of the foremost one of the train, whereby all the nuts in front of the one which is held by the detent jaws are permitted to move forwardly by gravity, past the front holding jaws 119, 120 and into engagement with the front sides of the rear holding jaws 134, 135, as shown in Fig. 29. The number of nuts which are thus permitted to pass from the front holding jaws to the rear holding jaws depends upon the size or height of the nuts and in the present instance it is assumed that only two of such nuts are free to pass from the front holding jaws to the rear holding jaws, as indicated in the last mentioned figure.

As the operation of the machine advances to the next step, indicated in Fig. 30, the front holding jaws 119, 120 are first closed so as to grip the tap shank and also arrest the train of nuts on the front part of the tap shank, which nuts have been released by the withdrawal of the detent jaws 152, 153 from opposite sides of the foremost nut of the train, as indicated in this figure, and after the front holding jaws 119, 120 have engaged the tap shank in the manner described the rear holding jaws 134, 135 are moved away from opposite sides of the tap shank, and out of the path of the screw nuts on the rear part of the latter, so that those nuts which for the time being were arranged on the rear part of the tap shank and have rested against the front sides of the rear jaws 134, 135, are now released and permitted to move forwardly on the shank by gravity and aided if desired by mechanical means so that they escape from the rear end of the tap shank onto the carrying pin 181 of the cleaning and drying apparatus, as shown in Fig. 30.

The operation of the machine now advances another step, during which the parts assume the position shown in Fig. 31, where the next following empty carrying pin 181 has moved into a position in which it replaces the previous nut-loaded carrying pin which has been moved away from the rear end of the tap shank. This figure of the drawing also indicates that the rear holding jaws 134, 135 have been closed and engaged the tap shank and also have intercepted those screw nuts which have been released by the opening of the front pair of holding jaws after the rear holding jaws have been closed. This figure also shows the detent jaws 152, 153 moved into their closed position in which the same engage with the opposite sides of the periphery of the foremost nut on the train on the upper part of the tap shank, and thereby prevent any nuts in this train from passing to the front holding jaws before the latter are closed on the tap shank, thus preventing any nuts from occupying a position on the shank between the front pair of closing jaws and interfering with the closing movement thereof, which otherwise would cause clogging of the machine.

While those operations of passing nuts from the tap to the shank, then successively engaging the nuts by the detent jaws, and the front and rear pairs of holding jaws, and discharging the same from the rear end of the tap shank, is progressing, additional nuts are being successively fed to the tap for the purpose of threading the nuts preparatory to being carried along the tap and shank and discharging the same in the manner described.

In the absence of any provision to permit the screw nuts to slide freely downwardly on the tap shank, the upper parts or front ends of the bores of the nuts are liable to engage with the upper corners of the rear shoulders 115, 118 of the flat sides 113 and 116 of the tap shank and thereby interfere with the free discharge of the nuts from this shank. In order to prevent such an occurrence the rear shoulders 115, 118 of the tap shank, preferably the upper parts thereof, are bevelled at 202, as shown in Figs. 7, 13 and 14, which bevelled faces avoid obstructions in the path of the nuts and permit them to slide downwardly on the tap shank without liability of becoming caught on these shoulders and interrupting the operation of the machine.

For the purpose of causing any chips from lodging on the holding faces 113, 116 of the tap shank which otherwise would interfere with the proper engagement of the holding jaws with these faces, and also to agitate the screw nuts as they slide downwardly on the tap shank, means are provided for delivering jets of fluid, such as compressed air, or liquid under pressure, or both against the faces 113 and 118 and adjacent parts of the tap shank, and also against the screw nuts thereon, from different angles, The fluid and compressed air for this purpose preferably consist of a liquid coolant such as is used for cooling the tap and associated parts, but compressed air either alone or in conjunction with a liquid may be used. This coolant is directed downwardly and rearwardly against the gripping faces 113, 116 of the shank and adjacent parts thereof and the nuts mounted on this shank by means of a plurality of forwardly and downwardly inclined upper nozzles 203 which are supplied by pipes 204 arranged above the tap shank. Liquid coolant is also directed against these gripping faces 113 and 116 and the adjacent parts of the tap shank and the nuts thereon from opposite sides of the tap shank by means of a plurality of lower nozzles 205 which are arranged at different angles below the tap shank, and supplied with liquid coolant by means of supply pipes 206 upon which the last-mentioned nozzles are mounted, as shown in Figs. 7, 8 and 14.

The mechanism which is employed for cleaning and drying the screw nuts after the same are tapped for the purpose of preventing the nuts from rusting and of which the carrying pins 181 form a part, is constructed as follows:

Arranged in rear of the nut threading or tapping mechanism is a reel or rotatable carrier which rotates about an axis which is inclined forwardly toward the longitudinal axis of the plunger, driving spindle and tap, which reel preferably consists of a central hub 207 and a plurality of arms or sweeps 208 radiating from this hub and each provided at its outer end with one of the nut carrying pins 181 in such a position that the several pins diverge upwardly in the form of a cone. Each of these carrying pins is successively moved into a lower receiving position at the rear end of the tapping mechanism and into an upper cleaning, drying and discharging position.

The reel is mounted upon an inclined axle 209 which is journaled to the adjacent part of the rear adjustable section 621 of the main frame, and during the rotation of the reel each of its carrying pins 181 is successively moved into a position so that its upper end is immediately in rear of the discharge end of the tap shank, and in axial alignment therewith.

At times it is necessary to rotate this reel more or less independently of the rest of the mechanism, as for example when setting up the machine or getting the same ready for operation, and to permit of such action means are provided whereby the reel may be readily coupled with and uncoupled from its axle 209. In the preferred construction these means comprise a coupling bolt 210 which slides vertically in a guideway 211 on an arm 212 which is secured to the upper end of the axle 209 and is movable into and out of engagement with an opening 213 in the hub of the reel on one side of said axle, as shown in Fig. 3. During the operation of the machine the reel supporting the nut carrying pins 181 is rotated intermittently with a period of rest during each forward step in its rotary movement and while the reel is at rest one of its nut carrying pins, of which there are preferably six in number, will come to rest in its lowermost position in alignment with the tap shank, while some of the pins on other parts of the reel are carrying other nuts to means which clean and dry the nuts thereon and render them rust proof; and other pins are carrying the cleaned nuts to the place where the latter are discharged from the machine; and still other pins are returned to the nut receiving position in line with the tap shank.

Although various means may be employed for thus imparting a rotary intermittent movement to the reel it is preferable for this purpose to employ the Geneva stop mechanism which is best shown in Figs. 1, 3 and 36 and which consists generally of a star wheel 214 secured to the axle 209 and provided with an annular row of radial slots 215, and an annular row of concave locking faces or seats 216 which alternate with said slots, and a driving shaft 217 provided with a crank pin 218 on one side of the axis of the driving shaft adapted to engage successively with the slots 215, and on its opposite side with a convex locking segment 219 which is adapted to engage successively with the concave locking faces 216.

During each rotation of the driving shaft 217 its driving or crank pin 218 engages with one of the driving slots 215 and turns the star wheel forwardly one step, and after this driving pin leaves the respective driving slot then the locking segment 219 engages with the next following concave locking face of the star wheel and holds the latter rigidly against turning. The number of driving slots and locking faces on the star wheel corresponds to the number of carrying pins on the wheel, six of which slots and a corresponding number of locking faces being employed in the star wheel to match the similar number of carrying pins 181 which are equally spaced on the circumference of the reel.

The motion for rotating the driving shaft 217 may be derived from any suitable source but must be of such a character that the reel is in synchronism with the nut tapping mechanism. In the present case motion is derived from the cam shaft 133 forming part of the tap holding mechanism, which shaft is connected by means of a universal joint 220 with a short or stub shaft 221 journaled on the adjustable rear section of the main frame and operatively connected with the driving shaft 217 of the reel by means of a chain belt 222 passing around sprocket wheels 223 and 224 which are mounted respectively on the stub shaft 221 and the driving shaft 217, as best shown in Fig. 3.

After one or more nuts have been deposited upon a carrying pin, the reel during its intermittent movement in the direction of the arrow shown in Fig. 32, carries the nuts on the respective pins 181 through a washing chamber 226 in which the nuts are subjected to the washing action of a plurality of streams or jets of a washing solution, such as soap suds or a mixture of water and soda which operates to remove any grease and chips adhering to the nuts, then the nuts are moved through a drying chamber 227 in which the screw nuts on the respective carrying pins are subjected to the drying action of streams or jets of air, so that all moisture on the nuts is removed therefrom, and then the nuts are presented to an ejecting device whereby the nuts are removed from the respective carrying pins of the reel and discharged from the machine ready for packing, shipping or such other disposition as may be desired.

The washing chamber, drying chamber, and discharging device are arranged along the elevated part of the path of the carrying pins of the reel while the nut receiving part of the reel is arranged adjacent to the depressed delivery end of the nut tapping mechanism. By this means it is possible to deliver the nuts directly from the tapping mechanism to the washing, cleaning and discharging mechanism, and without the use of any intermediate mechanism for carrying the nuts from tapping mechanism to the washing, drying, discharging mechanism and also enabling the machine as a whole to be made comparatively low and capable of being serviced easily and conveniently by the attendant.

The washing and drying chamber 226, 227 are preferably arranged side by side and separated from each other by an intervening upright partition or wall 228. The front side of these two chambers and the partitions between the same are provided with passageways which permit each of the arms of the reel and the nut supporting pins 181 thereon to rotate or sweep successively through these chambers for the purpose of presenting the nuts on the respective pins to the action of the washing solution and drying air which is supplied in these chambers respectively.

The passageways in the walls of these chambers to permit this movement of the reel arms and nut supporting pins through these chambers are of angular form. For this purpose the front wall 229 of the washing chamber is provided with an L-shaped slot or passageway 230, a similar slot 232 is formed in the partition wall 228 between the washing chamber 226 and the drying chamber 227 to permit the passage of the reel arms and carrying pins, together with the screw nuts mounted on the pins from the washing chamber to the drying chamber, and the front wall 233 of the drying chamber is likewise provided with an L-shaped slot 234 for the passage of the reel arms, the carrying pins, and the nuts thereon.

In the operation of the machine each reel arm in turn passes with the screw nuts on this carrying pin through the L-shaped slot in the front wall 229, and thence through the washing chamber, thence through the L-shaped slot 232 in the partition 229, then through the drying chamber, and then through the L-shaped slot 234 in the front wall 233 of the latter.

While passing through the washing chamber the screw nuts 51 on the respective carrying pins 181 are subjected to the washing action of jets or sprays of a cleaning solution of any suitable kind, such as a solution of soda and water, or soap and water which form suds. This washing solution is delivered in the form of jets or streams against opposite sides of the nuts, and also against the top of the same by a plurality of nozzles 236 arranged in the form of a horseshoe along the inner and outer side and the top of the path of the screw nuts and the carrying pins upon which they are mounted, which nozzles are supplied by a delivery pipe 237 having its inlet connected with any suitable source of supply. In the preferred construction, however, the washing solution is supplied from a tank 238 which forms a lower extension of the washing chamber, from which tank the liquid is supplied to the delivery pipe 237 under pressure by means of a pump 239 arranged on the exterior of the tank 238 and driven from any suitable source. The sprays or jets of washing solution delivered by the nozzles 236, after striking the nuts on the respective carrying pins drop into the tank 238 in the lower part of the washing chamber so that this washing solution may be used over again through the medium of the pump.

During this washing action of the cleaning solution on the nuts any grease, dirt or particle chips and the like are removed from the nuts and settle in the bottom of the tank 238 from where the same may be removed when necessary through the medium of a drain pipe 240 connected with the bottom of this tank and provided with a controlling valve 241. In order to maintain the washing solution at the required temperature to produce the best results, this solution may be heated by means of a gas burner 242 which directs its flame against the underside of the tank 238, as shown in Fig. 1, or by any other suitable means.

In order to prevent the escape of washing solution from the washing chamber through the L-shaped passageways or slots in the front wall 229 and the side wall 228 thereof to the exterior of this chamber, flexible closure means or curtains are provided which normally close these slots but yield under the pressure of reel arms and the parts mounted thereon while passing through the respective slots, and then automatically resume their normal closed position after the respective reel arm has passed through said slots.

These curtains may be of any suitable construction and may consist of a single pliable or bendable flap 243 which is secured at its upper edge to the front wall of the washing chamber and normally hangs in a vertical position by gravity so as to cover the respective parts of the L-shaped slot in this wall, as shown at the left hand of Fig. 42, in which position any washing solution which may be splashed or scattered upon being sprayed against the nuts is prevented from escaping from the washing chamber to the exterior thereof, adjacent to where the nuts enter this chamber. As the arm, together with its carrying pin and the nuts thereon, move through this slot from the exterior to the interior of the washing chamber, this flap 243 is deflected, as shown at the left of Fig. 41, and this deflection continues until the reel arm, carrying pin and screw nuts thereon have cleared this flap, when the later again resumes its normally closed position by gravity or its natural resilience.

The closure means may consist of two flaps 244, 245 which have their adjacent edges normally overlapping each other, while their opposite extremities are secured to the adjacent parts of the wall 228, as shown in Fig. 41 and the right side of Fig. 42. When an arm of the reel, together with a carrying pin and the screw nuts thereon, sweep through one of these slots, then these flaps will be deflected sufficiently to permit the passage of the reel arm, as shown at the right of Fig. 42, and those parts of the curtains which are in the path of the nut carrying pins are temporarily deflected, as shown in Fig. 48, to permit these arms and nut-laden pins to enter and leave the washing chamber. When these flaps have been cleared by said arm, pin and nuts, then these flaps are again returned to their normal operative position due to the resilience of the materials of which they are constructed.

The means for subjecting the screw nuts to the drying action of jets, streams or sprays of air of any required temperature, is delivered against the opposite sides and top of the screw nuts while passing through the drying chamber by means of a plurality of nozzles 246 which are arranged in the form of a horse-shoe around the opposite sides and top of the path of the screw nuts within the drying chamber, as shown in Fig. 3, which nozzles are connected with a supply pipe 247 to which air under pressure is supplied from any suitable source and by any approved means.

As the air jets strike the nuts any moisture or film of water adhering thereto as a result of the washing operation, will be rapidly evaporated and cause the nuts to be perfectly dry upon passing through the outlet slot 234 in the front wall 233 of the drying chamber.

Inasmuch as some of the washing solution which is delivered against the arms of the reel, the carrying pins thereon, and the nuts supported by these pins, will run by gravity down these arms while they are in an elevated position toward the hub of the reel, an objectionable amount of washing solution will flow toward the center of the reel and produce a sloppy condition. To avoid this each of the arms of the reel is provided adjacent to the hub thereof with a rubber collar 248 which intercepts the inward flow of any washing solution on the respective arm, and as the reel rotates, each of these intercepting collars is moved past a nozzle 249 which delivers a jet of air against the outer side of this intercepting collar so as to remove any moisture or drippings of wash water therefrom, thereby maintaining the area around the central part of this reel in a dry condition.

In order to reduce the area of contact between the nuts and the arms of the reel so as to permit of a more effective action on the nuts of the washing or cleaning liquid and the drying air, means are provided for raising a single nut or the lowermost one of a vertical stack of nuts on each pin from the respective arm or sweep 208 of the reel so that the underside of the respective nut will be exposed the maximum extent to the washing action of the fluid and the drying action of a stream of air which is subsequently directed against the nuts. The means for thus lifting the nuts from each arm or reel preferably consists of two elevating lugs 225 which project upwardly from the arm 208 on opposite sides of the respective pin 181 and present a comparatively narrow upper face on the reel arm upon which a single nut, or the lowermost nut of superposed nuts, rests with its underside, as best shown in Fig. 40. In this particular figure two superimposed nuts are arranged on two of the carrying pins 181.

The nuts, if permitted to rest against each other on their opposing sides, would render it difficult, if not impossible, to completely clean the opposing surfaces of the nuts by means of a washing liquid and also prevent reliable drying of the same by means of air before discharging the nuts from the machine. Means are therefore provided whereby a plurality of superimposed nuts on each pin, for example two nuts on the same pin, are separated vertically from each other and are held in this position on the respective carrying pin of the reel, preparatory to and while being presented to the washing and drying operation.

When a plurality of screw nuts are mounted on each carrying pin 181, for example two screw nuts which are superimposed one above the other, as shown in Figs. 1, 2, 3, 32, 35 and 39, 40, it is necessary to separate these nuts from one another so that their opposing ends do not engage with each other and thus permit the washing solution to reach both ends of each nut for completely removing any chips, oil and other foreign substance therefrom while these nuts are passing through the washing chamber, and also to permit the air jets to engage with both ends of each nut for completely drying the nuts while they are passing through the drying chamber.

Means are therefore provided for separating the nuts on the carrying pins so that the same do not engage with each other end to end, while passing through the washing chamber and the drying chamber, and as these separating means in the washing chamber and the drying chamber are identical the following description of one of these devices will suffice for both of them:

The numeral 250 represents an elevating cam arranged adjacent to one side of the lower part of the path of the carrying pins 181 within the washing chamber and also within the drying chamber. As shown in Figs. 32, 37, 38 and 39 the elevating cam 250 is arranged on the outside of the path of the nuts but if desired the same may be arranged on the inner side thereof, or like cams may be arranged on both sides of said path. Each of these cams is supported in any suitable manner upon an adjacent part of the adjustable rear frame section 621, and is provided with a rising front part 251 and a descending rear portion 252. As a carrying pin 181 passes this elevating cam the underside of the lower nut of a pair engages with the upper side of this cam, and during the first part of this engagement this lower nut rides up on the rising part 251 of this cam so that the two nuts are elevated on the carrying pin, as shown in Fig. 38. Adjacent to the rear end of this elevating cam is arranged a plurality of retaining arms corresponding to the number of nuts on the carrying pin, in the present case two retaining arms 253, 254, which arms are arranged one above the other and arranged lengthwise alongside of the path of the screw nuts on the outer side of the path of the same. These retaining arms are constructed of spring metal or other resilient material and are supported at their front ends on brackets 255 which form part of the adjustable rear section of the main frame of the machine, and these retaining arms, together with the elevating cam, are curved concentrically with the axis of the carrying reel, as shown in Fig. 37.

The lower retaining arm has its front end arranged over the descending portion 252 of the elevating cam, and the front end of the upper retaining arm 254 extends forwardly beyond the lower retaining arm 253 and terminates approximately at the highest part of the elevating cam between the rising part 251 and the descending part 252 thereof, as shown in Fig. 38.

As the pair of screw nuts on the carrying pin 181 continue their forward movement over the elevating cam after these two screw nuts have been raised in unison and in contact with each other, such further movement of these nuts will cause the upper one to first engage the upper retaining arm 254 and by frictional engagement therewith the upper nut will be held in an elevated position during the continued forward movement of the carrying pin upon which these nuts are mounted. Thereafter the lower screw nut will ride down the descending rear part 252 of the elevating cam for a short distance so as to be separated somewhat from the upper screw nut. Then this lower nut will engage with the lower retaining arm 253 and be held by frictional engagement therewith against further downward movement so that the two screw nuts, after passing rearwardly beyond the elevating cam, will both be held in an elevated position above the supporting lugs 225 of the respective reel arm. The two nuts will also be held in a spaced-apart position by the lower and upper retaining arms, which continue their frictional engagement with the retaining arms until the nuts reach the rear ends of these arms and then the nuts again drop by gravity until they again rest upon the supporting lugs 225.

The rear ends of the retaining arms 253, 254 extend a short distance past the washing and drying nozzles 237, 237, whereby the screw nuts, while in a position in which they are separated from each other end to end, will be subjected to the cleaning and drying action of the streams of washing solution and air which will strike not only the sides of the screw nuts but also the opposite ends thereof, and thereby thoroughly remove any chips and foreign matter therefrom and effectively dry the same.

In order to insure retaining the screw nuts in the elevated position on the carrying pin 181 and also in a position in which the two nuts are separated end from end after being positioned by the elevating cam and retaining arms, the outer side of each carrying pin is provided with two ratchet notches which are arranged one upon the other and form upwardly facing lower and upper shoulders 256, 257. As the upper nut is raised by the elevating cam and then pressed laterally by the upper retaining arm 254 the lower edge of this nut on one side of the bore is caused to engage with the upper shoulder 257 of the carrying pin 181, and when the lower nut subsequently descends slightly upon riding down the descending part of the elevating cam and is pressed laterally by the lower retaining arm 253, the edge of this lower nut adjacent to one side of its bore is engaged with the lower shoulder 256 of the respective carrying pin 181, as shown in Fig. 39, thereby reliably holding both nuts in an elevated position but separated from each other end for end so that the streams of washing solution and jets of drying air will be able to effectively reach all parts of the external and internal surface of these nuts. As the nuts are about to leave the retaining arms 253, 254 the same are engaged on their sides by twirling lips 425 on the ends of these arms, as shown in Fig. 32, whereby the nuts are given a rotary twist or twirl and thus assume a different position relative to the streams of cleaning solution in passing through successive cleaning chambers.

The relation of the nut separating and retaining means which have been just described with reference to the washing apparatus and the method of operation during this washing action is repeated in the same manner by the elevating and retaining mechanism of identical construction associated with the nozzles 246 of the air drying device within the drying chamber, so that the nuts are separated from each other at their opposing ends, and all parts of the nuts are subjected to the drying action of the air for effectively removing any moisture therefrom, preparatory to discharging the nuts from the machine.

After the nuts are dried the same may be coated with a rust preventative which may be applied to the nuts by a nozzle 724 and deliver the preventative on the nuts while the same are in the chamber 227 and before leaving the second set of holding arms 253, 254, as shown in Fig. 32.

The mechanism for removing the nuts from the carrying pins 181 and discharging the same from the machine is constructed as follows:

The numeral 258 represents the delivery box or chamber arranged in front of the drying chamber of the machine and provided in its front transverse wall with an inlet passage 259, and in its rear longitudinal wall with an outlet passage 260, and in its bottom with a longitudinal stripper slot 261 which extends from the inlet 259 to the rear transverse wall of this chamber.

Within the stripper slot is arranged a U-shaped stripping cam, the two sides or sections 262 of which are arranged lengthwise within the slot 261 and separated from each other by an intervening passageway 263 which is open at its front end but closed at its rear end and is curved concentrically with the axis of the nut carrying reel. This stripper cam is formed on a plate 264 which is secured to the underside or bottom of a delivery chamber, as shown in Fig. 40. The two sections of the stripper cam are arranged on opposite sides of the path of the carrying pins 181 and are inclined upwardly relative to the circular path of these pins and the front ends of these stripper cam sections extend forwardly beyond the front transverse wall of the delivery chamber, and to a point below the path of the underside of the lowermost screw nuts while the same are resting on the elevating lugs 225 which are associated with each carrying pin on the reel, as shown in Fig. 40.

As the reel turns forwardly each of its carrying pins 181 enters the slot 263 between the stripping cam sections 262 of the delivery chamber, and during such movement the underside of the lower nut on the respective carrier pin engages its opposite parts with the upper side of the two stripper cam sections 262, so that during the continued movement of the respective carrier pin through the slot 263 of the stripper cam sections, the two screw nuts on the carrier pin are elevated on the latter, as shown in the central part of Fig. 40. As this forward movement of the carrier pin continues through this slot 263 and before this pin escapes therefrom, the stripper cam sections 262 have elevated the two screw nuts to such an extent that they are completely separated or lifted off the respective carrying pin. The instant this occurs the screw nuts are exposed to a lateral blast or stream of air which is delivered transversely rearwardly against the same by means of a plurality of nozzles 265 arranged above the bottom of the delivery chamber and operating to force the screw nuts rearwardly over and through the outlet opening 260 in the rear longitudinal wall of the delivery chamber where the nuts may be disposed of in any suitable manner ready for storage, packaging and use. The several air delivery nozzles 265 which supply the air streams or jets for discharging the nuts from the delivery chamber may be supplied from any suitable source through the medium of a compressed air supply pipe 266 upon which these nozzles 265 are mounted.

After each carrying pin 181 of the reel has passed beyond the slot 263 of the nut delivering mechanism the same, under the intermittent rotation of the reel, is again presented to the tap shank for receiving another supply of threaded nuts therefrom, after which the cycles of operations are repeated in the manner described, so long as the machine is running. The chamber 258 is tilted toward the outlet so that the nuts will slide out by gravity, but the air pressure is applied to also help to clean out any chips or moisture that may be left in the threads of the nuts.

It has been found in practice that at times it is desirable to shift the tap and its shaft lengthwise or rearward to some extent relative to the shunting collar and pins in order to adapt the tap to operate most effectively on nuts of certain hardness and also to compensate for variations in length of the tap shank as supplied by the manufacturer and also to allow for changes in the lead of the tap when the same is ground and results in producing either finer, coarser or longer chips during the threading operation. Also the lead of the tap may be such as to require a change in its position relative to the guiding and other parts. This is accomplished in the present case by constructing a part of the rear section 621 of the main frame in the form of a slide or table 300 which is guided by means of inclined longitudinal ways 301 on the rear part of the front stationary section of the main frame and is adjusted in a direction parallel with the axis of the plunger and nut rotating spindle by means of an adjusting screw 302 rotating in a slot 303 on the slide but held against lengthwise movement thereon, and having its thread working in the adjacent stationary part of the main frame, as shown in Figs. 1, 3, 4, 19 and 20. After the slide 300 has been adjusted to the required position the same is held in place by clamping screws 304 secured to the stationary front section 50 of the main frame and passing through longitudinal slots 305 in the slide 300, as shown in Figs. 3, 4 and 20.

On this slide are mounted the front and rear pairs of tap shank holding jaws 119, 120 and 134, 135 and the means for guiding and actuating them so that all of the parts which cooperate to hold the tap and its shank form a complete unit, of which all the members move in unison lengthwise of the axis of the nut driving spindle and plunger and enable the tap to be adjusted to suit different requirements without disturbing the relative position of the shank, holding jaws and the parts associated therewith.

In the preferred construction the rear movable section 621 of the main frame, of which the slide 300 forms a part, also carries the bearings for the reel shaft 209 and the shaft 217 of the intermittent reel rotating mechanism, so that the nut carrying reel and the movable parts cooperating therewith are adjusted in unison with the tap shank holding mechanism and thus dispenses with the necessity of a separate adjusting mechanism for the nut carrying reel and associated parts.

In the present construction the housings containing the nut washing, drying and discharging means are not adjusted with the tap holding and nut carrying mechanism but remain fixed on the stationary base 306 of the main frame inasmuch as the required longitudinal adjustment of the tap is relatively small and no objectionable relative positioning of the nut carrier and the nut cleaning and delivery mechanism occurs within the adjustable range of the screw threading tap by the means above described, but if desired this housing may also be made adjustable.

In the preferred construction of this machine the inclined front and rear parts 50 and 621 of the frame converge downwardly and have the form of troughs, and at the lowermost part of this convergence the frame is provided with an outlet opening 366 whereby the coolant, chips and drippings from the adjacent parts of the machine are caught in these troughs and discharged downwardly through the opening 366 and into a receptacle 307 which is mounted on the base of the frame immediately below this opening. This receptacle is preferably provided in its bottom and side walls with openings 308 which are covered by screens 309 so as to permit the liquid to escape but retain the chips which are disposed of as scrap metal.

Instead of operating the rock shaft 100 of the shutter mechanism by the means which are shown in Figs. 1, 2, 3, 10, 11 and 12 this shaft may be oscillated by the modified means for this purpose which are shown in Figs. 43, 44, 45, and which are constructed as follows:

In this construction the bearings 267 in which the rock shaft 268 is journaled are not mounted rigidly on the adjacent stationary part of the machine, as shown in Figs. 10 and 11, but instead are mounted on the adjacent stationary part of the machine, for example the nut chute, by means of spring arms 269, as shown in Figs. 43, 44. The central part of the shaft 268 is provided with a depending trip arm 270 which terminates in a tip or finger 271 which is constructed of fiber or similar material which will not wear unduly when subjected to considerable rubbing or friction action. This trip arm engages its finger with the upper side of the plunger 75 and is of a length greater than the normal distance between the axis of the shaft 268 and the upper surface of the plunger 75. When, therefore, the plunger 75 is withdrawn from the nut chute and moved backwardly into its rearmost position the upper side of the same, by rubbing against the finger 271 at the lower end of the trip arm 270, will cause the same to be inclined or tilted toward the left and thereby rock the shaft 268 so that its spring arms 272 will be moved downwardly, and by engagement with the cam ways 273 will cause the shutters 274 to be moved into their closed position in which they are arranged in the path of the screw nut preparatory to being pushed by the plunger from the chute to the tap, as shown in Figs. 43, 44 and 45.

During the first part of the subsequent forward movement of the plunger the frictional engagement of its upper side with the lower end of the finger 271 of the trip arm 270 will cause this trip arm to be first shifted to the forwardly inclined position indicated by dotted lines in Fig. 43, during which the resilient shifting arms 272, due to engagement with the cam ways 273 will be flexed or strained, and when the front end of the plunger, by engagement with the nut resting against the shutters 274, disengages the latter from the detent pins which have been described heretofore with reference to the operation of the shutters 96, as shown in Figs. 10, 46, 47, then the resilience of the spring arms 72 will quickly open these shutters and permit the nut to escape therefrom and pass under the action of the plunger to the tap.

In the first part of the backward movement of the plunger 75 in the construction shown in Figs. 43, 44, 45, the frictional engagement of the upper side of the same with the trip arm 270 will cause the latter to be again shifted from the forwardly inclined position shown in Fig. 43 to the rearwardly inclined position shown by full lines in this figure, thereby again straining the spring shifting arms 272 but in the opposite direction, and causing the shutters 274 to bear against the outer opposite sides of the plunger 75. The instant, however, that the front end of the plunger, during its backward movement, clears the shutters then the latter, due to the resilience of the spring arms 272, will be quickly snapped into their innermost position in which the inner edges thereof stand in the path of the marginal parts of the lowermost screw nut in the supply chute and support the same, preparatory to being fed by the plunger to the tap.

For the purpose of economizing in the use of cleaning liquid or air and also rust preventative each of the pipes 237, 247 and 724 supplying these fluids may be automatically controlled by a valve mechanism which is co-ordinated with the rotary nut carrying reel so that streams or sprays of cleaning or rust preventing fluid are present when nuts are in position to receive such streams but these streams will be cut off when the nuts are not in a position to receive these streams. Although these automatic control means may vary the same are preferably constructed as shown in Figs. 3, 35 and 52 as follows:

The numeral 724 represents a valve body arranged in each of the pipes or nozzles 237, 247 and 724 and having a valve stem 725 projecting laterally therefrom, a trip lever 727 pivoted on the valve body and engaging the stem, and a spring 726 whereby the valve stem is yieldingly moved outwardly into a position in which the valve is closed and the trip lever 727 is yieldingly held in the path of the outer ends of the arms or sweeps 208 of the rotary carrier or reel. When no reel arm is adjacent to the valve body 724 the spring 725 of the respective valve pushes the stem 725 outwardly to close this valve and holds the trip lever 727 in the path of these reel arms, as shown by dotted lines in Fig. 52. As a reel arm 208 moves past the respective valve body this arm engages the trip lever 727 thereof and deflects the same, as shown by full lines in Fig. 52, thereby opening this valve and permitting the nozzles connected with the respective fluid supply pipe to deliver sprays or streams of fluid against the nuts on the respective reel arm. As the latter continues its forward movement and carries the nuts thereon out of the spray receiving position this arm releases the trip lever 727 and the spring 725 closes this valve so that the fluid normally discharged by the same is not wasted.

In order to avoid transmission of heat to the main frame or base 306 from the chamber 238 containing the liquid which is heated by the burner 242, these two bodies may be thermally insulated from each other either by an intervening air space or by an asbestos separator 823 arranged between these members, as shown in Figs. 1 and 3, thereby avoiding warping of the parts mounted on the base and preserving accurate relation of the several working parts mounted thereon.

It is, of course, understood that the means for operating the various units of this machine, the driving mechanism related to each of these units, is so timed that the several mechanisms cooperate properly with each to secure a harmonious working of the machine as a whole. It is also to be noted that each unit is adapted to be operated at a speed best suited for a particular size or kind of nut, and that the provision of means for operating any part of the machine at the most desirable speed is an obvious expedient.

I claim as my invention:

1. A nut threading machine comprising a main frame, a tubular driving bushing which is rotatably mounted in an inclined position on said frame and through which nuts to be threaded pass from the upper to the lower end thereof, a non-rotatable threading tap which is arranged lengthwise within the driving bushing and over which the nuts to be threaded pass, means for supplying blank nuts in an inclined position to the upper end of said driving bushing, including a supply chute adapted to guide blank nuts to the upper end of said bushing, a plunger adapted to push the nuts from said chute into said bushing, and a shutter mechanism for supporting the lowermost of said nuts in axial alinement with said bushing and releasing the same preparatory to engagement by said plunger.

2. A nut threading machine comprising a main frame, an inclined tubular driving bushing which is rotatably mounted on said frame and through which the nuts to be threaded pass from the front to the rear end thereof, a non-rotatable inclined threading tap arranged lengthwise in said bushing, a chute for supplying nuts to said bushing, a plunger for pushing the nuts from said chute into the upper end of said bushing, and means for controlling the position of said nuts preparatory to being moved from the chute to said bushing including shutters movable toward and from each other into and out of the path of said nuts from the chute to said bushing and at right angles to said path.

3. A nut threading machine comprising a main frame, a tubular driving bushing which is rotatably mounted on said frame and through which the nuts to be threaded pass from the front to the rear end thereof, a non-rotatable inclined threading tap arranged lengthwise in said bushing, a chute for supplying nuts to said bushing, a plunger for pushing the nuts from said chute into the upper end of said bushing, and means for controlling the position of said nuts preparatory to being moved from the chute to said bushing including shutters movable toward and from each other into and out of the path of said nuts from the chute to said bushing and at right angles to said path, and means for actuating said shutters in unison with the movement of said plunger.

4. A nut threading machine comprising a main frame, a tubular driving bushing which is rotatably mounted on said frame and through which the nuts to be threaded pass from the front to the rear end thereof, a threading tap arranged lengthwise in said bushing, a chute for supplying nuts to said bushing, a plunger for pushing the nuts from said chute into said bushing, and means for controlling the position of said nuts preparatory to being moved from the chute to said bushing, including shutters movable toward and from each other into and out of the path of said nuts from the chute to said bushing and at right angles to said path, and means for actuating said shutters in unison with the movement of said plunger, comprising downwardly diverging cam ways arranged on the shutters, resilient shifting arms having their rear ends movable in said cam ways, a rock shaft carrying said shifting arms, and means for transmitting motion from said plunger to said rock shaft.

5. A nut threading machine comprising a main frame, a tubular driving bushing which is rotatably mounted on said frame and through which the nuts to be threaded pass from the front to the rear end thereof, a threading tap arranged lengthwise in said bushing, a chute for supplying nuts to said bushing, a plunger for pushing the nuts from said chute into said bushing, and means for controlling the position of said nuts preparatory to being moved from the chute to said bushing including shutters movable toward and from each other into and out of the path of said nuts from the chute to said bushing and at right angles to said path, and means for actuating said shutters in unison with the movement of said plunger, comprising downwardly diverging cam ways arranged on the shutters, resilient shifting arms having their rear ends movable in said cam ways, a rock shaft carrying said shifting arms, and means for transmitting motion from said plunger to said rock shaft, including a rock arm connected with said rock shaft, and a shipper rod operatively connected with said rock arm.

6. A nut threading machine comprising a nut supply device, a tapping device, a plunger for moving nuts from said supply device to said tapping device and positioning means for controlling the position of said nuts preparatory to delivering the same to said tapping device, including transversely movable shutters arranged between said supply device and said tapping device and adapted to temporarily support said nuts, and snap means for causing said shutters to open quickly during a part of the forward movement of said plunger and a nut, and to close quickly during a part of the backward movement of said plunger.

7. A nut threading machine comprising a nut supply device, a tapping device, a plunger for moving nuts from said supply device to said tapping device and positioning means for controlling the position of said nuts preparatory to delivering the same to said tapping device, including transversely movable shutters which are bowed forward and are pivoted at their upper ends, a support against which the lower ends of said shutters bear yieldingly in a backward direction, an inner stop for arresting the inward movement of said shutters, an outer stop for arresting the outward movement of said shutters, an intermediate detent pin arranged between each outer stop and said inner stop and adapted to be engaged either by the outer edge of one of the shutters or by the front side of the same, said outer and inner stop being longer than said intermediate detent pin, a plunger adapted to push nuts from said supply device against said shutters and deflect them out of engagement from the intermediate detent pins, and resilient shifting means for quickly moving said shutters when released out of the path of said nuts and over said detent pins, and subsequently re-engaging the outer edges of said shutters with the inner side of said detent pins upon withdrawal of said plunger from said tapping device.

8. A nut threading machine comprising a nut supply device, a tapping device, a plunger for moving nuts from said supply device to said tapping device and positioning means for controlling the position of said nuts preparatory to delivering the same to said tapping device including transversely movable shutters which are bowed forward and are pivoted at their upper ends, a support against which the lower ends of said shutters bear yieldingly in a backward direction, an inner stop for arresting the inward movement of said shutters, an outer stop for arresting the outward movement of said shutters, an intermediate detent pin arranged between each outer stop and said inner stop and adapted to be engaged either by the outer edge of one of the shutters or by the front side of the same, said outer and inner stop being longer than said intermediate detent pin, a plunger adapted to push nuts from said supply device against said shutters and deflect them out of engagement from the intermediate detent pins, resilient shifting means for quickly moving said shutters when released out of the path of said nuts and over said detent pins and subsequently re-engaging the outer edges of said shutters with the inner side of said detent pins upon withdrawal of said plunger from said tapping device, including cam ways arranged on said shutters, spring rock arms engaging said cam ways, a rock shaft carrying said spring rock arms, and means for rocking said shaft in one direction during the middle part of the forward stroke of the plunger, and in the opposite direction during the middle part of the backward stroke of the plunger.

9. A nut threading machine comprising an inclined threading tap provided at its rear end with a shank, means for supplying nuts to the tap and rotating the same relatively thereto, front and rear holding means for engaging the shank alternately at different parts of its length for preventing turning of the tap but permitting intermittent forward movement of the nuts over said shank, and detent means adapted to engage said nuts in front of said front holding means and prevent forward movement of the nuts while the front holding means are out of engagement with said shank and said rear holding means are in engagement with said shank, said detent means including two jaws adapted to engage opposite sides of said nuts, and two carriers which are movable transversely relative to opposite sides of said shank and which yieldingly support said jaws.

10. A nut threading machine comprising an inclined threading tap provided at its rear end with a shank, means for supplying nuts to the tap and rotating the same relatively thereto, front and rear holding means for engaging the shank alternately at different parts of its length for preventing turning of the tap but permitting intermittent forward movement of the nuts over said shank, and detent means adapted to engage said nuts in front of said front holding means and prevent forward movement of the nuts while the front holding means are out of engagement with said shank and said rear holding means are in engagement with said shank, said detent means including two jaws adapted to engage opposite sides of said nuts, and two carriers which are movable transversely relative to opposite sides of said shank and which yieldingly support said jaws, a stationary frame upon which said carriers are guided, a transversely reciprocating member guided on said frame, a tappet arranged on said member and engaging with one of said carriers for actuating the same, a rock lever pivoted on the frame and having one arm engaging the other carrier for actuating the same, and another tappet on said member engaging the other arm of said lever for rocking the same.

ERIC M. DE SHERBININ.